United States Patent
Li et al.

(10) Patent No.: US 11,336,346 B2
(45) Date of Patent: May 17, 2022

(54) METHOD AND APPARATUS FOR HANDLING BEAM SENSING FOR SIDELINK RESOURCE IN A WIRELESS COMMUNICATION SYSTEM

(71) Applicant: ASUSTek Computer Inc., Taipei (TW)

(72) Inventors: Ming-Che Li, Taipei (TW); Li-Chih Tseng, Taipei (TW); Wei-Yu Chen, Taipei (TW); Li-Te Pan, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 183 days.

(21) Appl. No.: 16/524,943

(22) Filed: Jul. 29, 2019

(65) Prior Publication Data

US 2020/0036422 A1    Jan. 30, 2020

Related U.S. Application Data

(60) Provisional application No. 62/711,345, filed on Jul. 27, 2018, provisional application No. 62/711,315, filed on Jul. 27, 2018.

(51) Int. Cl.
| | |
|---|---|
| *H04B 7/06* | (2006.01) |
| *H04B 7/0413* | (2017.01) |
| *H04W 74/08* | (2009.01) |
| *H04W 72/04* | (2009.01) |

(52) U.S. Cl.
CPC ......... *H04B 7/0617* (2013.01); *H04B 7/0413* (2013.01); *H04W 72/046* (2013.01); *H04W 74/08* (2013.01)

(58) Field of Classification Search
None
See application file for complete search history.

(56) References Cited

U.S. PATENT DOCUMENTS

| | | | | |
|---|---|---|---|---|
| 6,697,642 | B1 * | 2/2004 | Thomas | H01Q 3/2605 342/374 |
| 2002/0115474 | A1 * | 8/2002 | Yoshino | H04W 16/28 455/562.1 |
| 2019/0306835 | A1 * | 10/2019 | Hoang | H04W 72/082 |
| 2020/0015298 | A1 * | 1/2020 | Chae | H04W 24/08 |

FOREIGN PATENT DOCUMENTS

KR    20190108121    9/2019

OTHER PUBLICATIONS

Office Action from Korean Intellectual Property Office in corresponding KR Application No. 10-2019-0091865, dated Oct. 19, 2020.

\* cited by examiner

*Primary Examiner* — Alex Skripnikov
(74) *Attorney, Agent, or Firm* — Skaar Ulbrich Macari, P.A.

(57) ABSTRACT

A method and apparatus are disclosed from the perspective of an User Equipment (UE). In one embodiment, the method includes the UE performing sensing on a second direction or beam. The method also includes the UE performing a sidelink transmission on a resource on a first direction or beam, wherein the resource is selected based on at least sensing result of the second direction or beam.

20 Claims, 26 Drawing Sheets

(a) Digital beamforming (b) Analogue beamforming (c) Hybrid beamforming: Left = fully connected, Right = sub-array Different deployment scenarios with Single TRP cell

METHOD AND APPARATUS FOR HANDLING BEAM SENSING FOR SIDELINK RESOURCE IN A WIRELESS COMMUNICATION SYSTEM

CROSS-REFERENCE TO RELATED APPLICATIONS

The present application claims the benefit of U.S. Provisional Patent Application Ser. Nos. 62/711,315 and 62/711,345 filed on Jul. 27, 2018, the entire disclosures of which are incorporated herein in their entirety by reference.

FIELD

This disclosure generally relates to wireless communication networks, and more particularly, to a method and apparatus for handling beam sensing for sidelink resource in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of an User Equipment (UE). In one embodiment, the method includes the UE performing sensing on a second direction or beam. The method also includes the UE performing a sidelink transmission on a resource on a first direction or beam, wherein the resource is selected based on at least sensing result of the second direction or beam.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: R2-162366, "Beam Forming Impacts", Nokia, Alcatel-Lucent; R2-163716, "Discussion on terminology of beamforming based high frequency NR", Samsung; R2-162709, "Beam support in NR", Intel; R2-162762, "Active Mode Mobility in NR: SINR drops in higher frequencies", Ericsson; R3-160947, TR 38.801 V0.1.0, "Study on New Radio Access Technology; Radio Access Architecture and Interfaces"; R2-164306, "Summary of email discussion [93bis #23][NR] Deployment scenarios", NTT DOCOMO; 3GPP RAN2 #94 meeting minute; R2-162251, "RAN2 aspects of high frequency New RAT", Samsung; TS 36.213 V15.1.0 (2018-03), "E-UTRA; Physical layer procedures (Release 15)"; and TS 36.214 V15.1.0 (2018-03), "E-UTRA; Physical layer; Measurements (Release 15)". The standards and documents listed above are hereby expressly incorporated by reference in their entirety.

Figure 1:
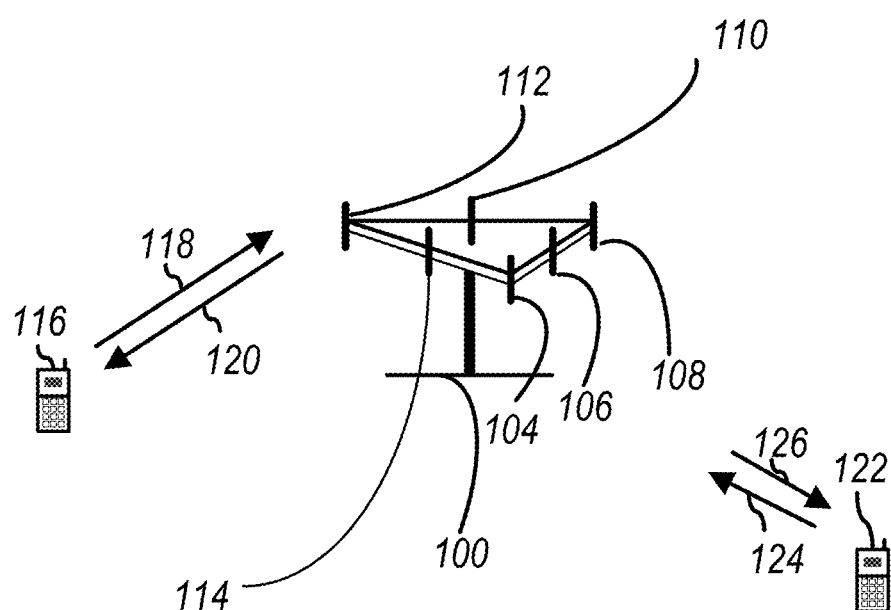
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
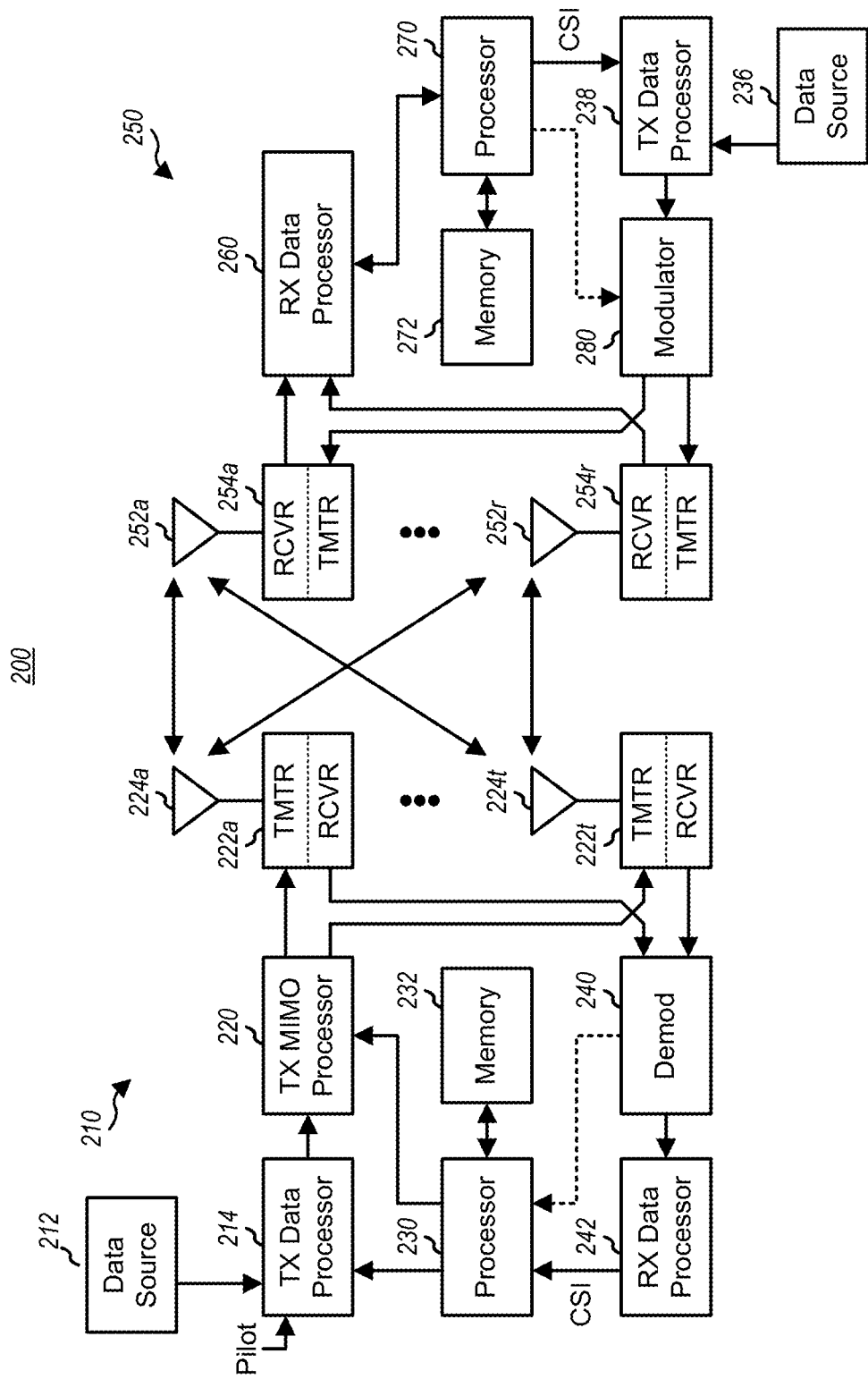
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
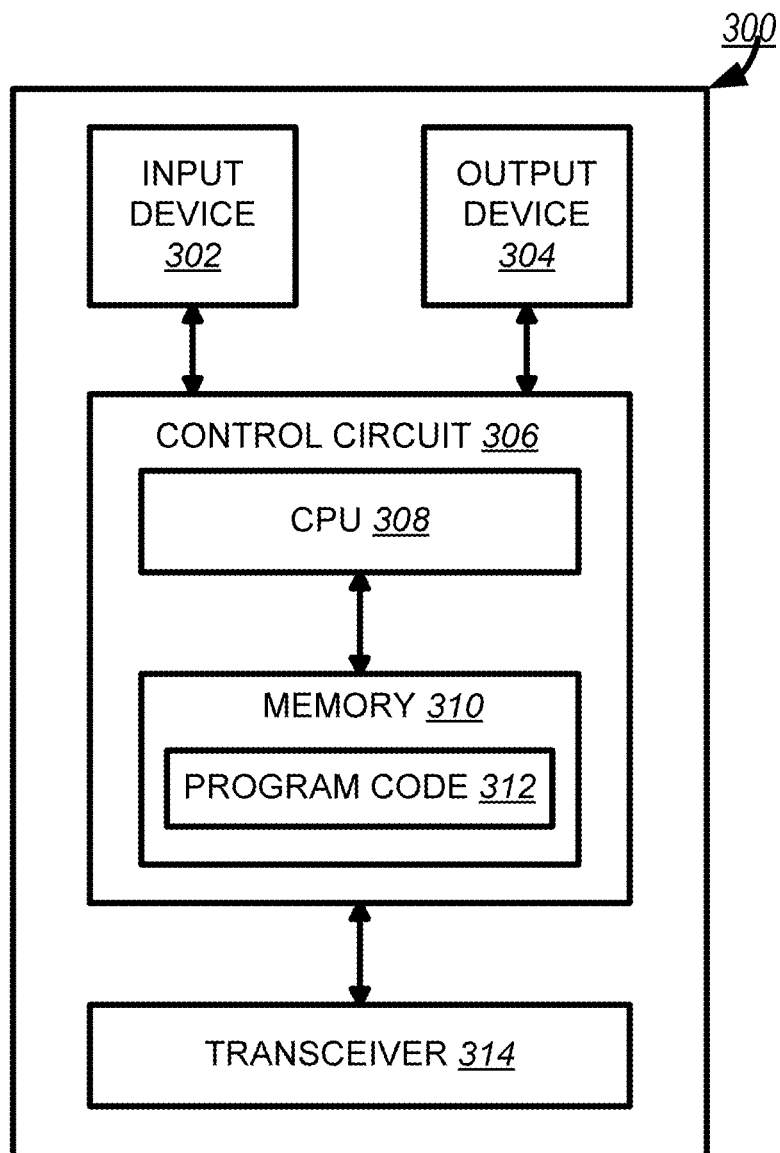
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
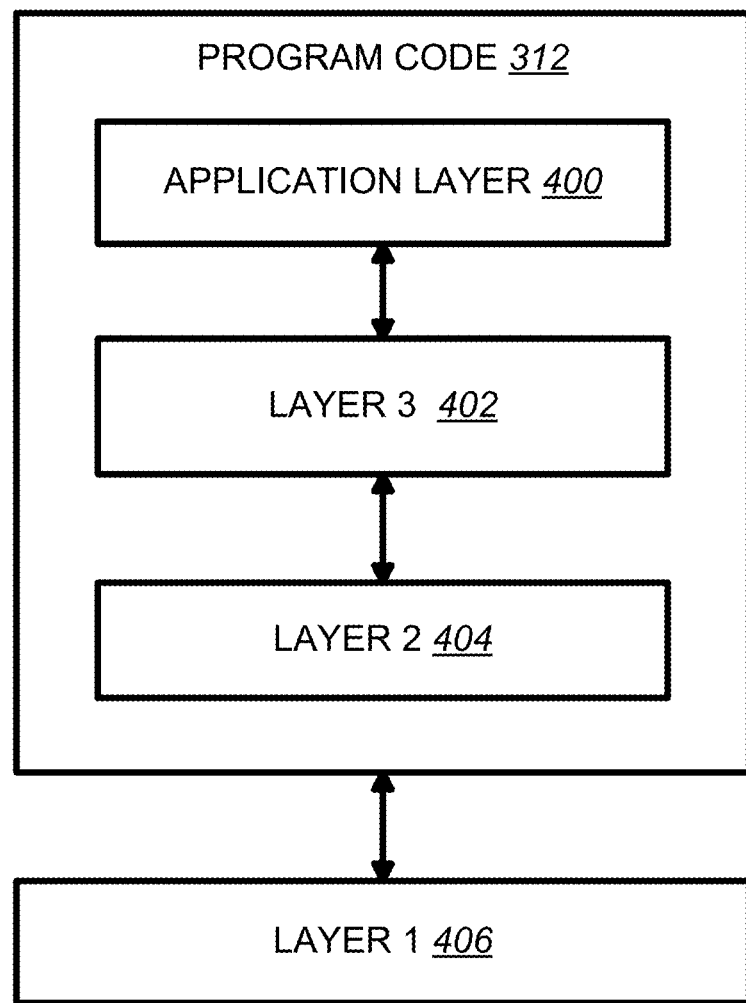
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP standardization activities on next generation (i.e. 5G) access technology have been launched since March 2015. In general, the next generation access technology aims to support the following three families of usage scenarios for satisfying both the urgent market needs and the more long-term requirements set forth by the ITU-R IMT-2020:
  eMBB (enhanced Mobile Broadband)
  mMTC (massive Machine Type Communications)
  URLLC (Ultra-Reliable and Low Latency Communications).

An objective of the 5G study item on new radio access technology is to identify and develop technology components needed for new radio systems which should be able to use any spectrum band ranging at least up to 100 GHz. Supporting carrier frequencies up to 100 GHz brings a number of challenges in the area of radio propagation. As the carrier frequency increases, the path loss also increases.

Based on 3GPP R2-162366, in lower frequency bands (e.g., current LTE bands<6 GHz) the required cell coverage may be provided by forming a wide sector beam for transmitting downlink common channels. However, utilizing wide sector beam on higher frequencies (>>6 GHz) the cell coverage is reduced with same antenna gain. Thus, in order to provide required cell coverage on higher frequency bands, higher antenna gain is needed to compensate the increased path loss. To increase the antenna gain over a wide sector beam, larger antenna arrays (number of antenna elements ranging from tens to hundreds) are used to form high gain beams.

As a consequence the high gain beams being narrow compared to a wide sector beam, multiple beams for transmitting downlink common channels are needed to cover the required cell area. The number of concurrent high gain beams that access point is able to form may be limited by the cost and complexity of the utilized transceiver architecture. In practice, in higher frequencies, the number of concurrent high gain beams is much less than the total number of beams required to cover the cell area. In other words, the access point is able to cover only part of the cell area by using a subset of beams at any given time.

Based on 3GPP R2-163716, beamforming is a signal processing technique used in antenna arrays for directional signal transmission/reception. With beamforming, a beam can be formed by combining elements in a phased array of antennas in such a way that signals at particular angles experience constructive interference while others experience destructive interference. Different beams can be utilized simultaneously using multiple arrays of antennas.

Beamforming can be generally categorized into three types of implementation: digital beamforming, hybrid beamforming, and analog beamforming. For digital beamforming, the beam is generated on the digital domain, i.e. the weighting of each antenna element can be controlled by baseband (e.g. connected to a TXRU (Transceiver Units)). Therefore it is very easy to tune the beam direction of each subband differently across the system bandwidth. Also, to change beam direction from time to time does not require any switching time between OFDM (Orthogonal Frequency Division Multiplexing) symbols. All beams whose directions cover the whole coverage can be generated simultaneously. However, this structure requires (almost) one-to-one mapping between TXRU (transceiver/RF chain) and antenna element and is quite complicated as the number of antenna element increases and system bandwidth increases (also heat problem exists).

For Analog beamforming, the beam is generated on the analog domain, i.e. the weighting of each antenna element can be controlled by an amplitude/phase shifter in the RF (Radio Frequency) circuit. Since the weighing is purely controlled by the circuit, the same beam direction would apply on the whole system bandwidth. Also, if beam direction is to be changed, switching time is required. The number of beams generated simultaneous by an analog beamforming depends on the number of TXRU. Note that for a given size of array, the increase of TXRU may decrease the antenna element of each beam, such that wider beam would be generated. In short, analog beamforming could avoid the complexity and heat problem of digital beamforming, while is more restricted in operation. Hybrid beamforming can be considered as a compromise between analog and digital beamforming, where the beam can come from both analog and digital domain.

Figure 5A:
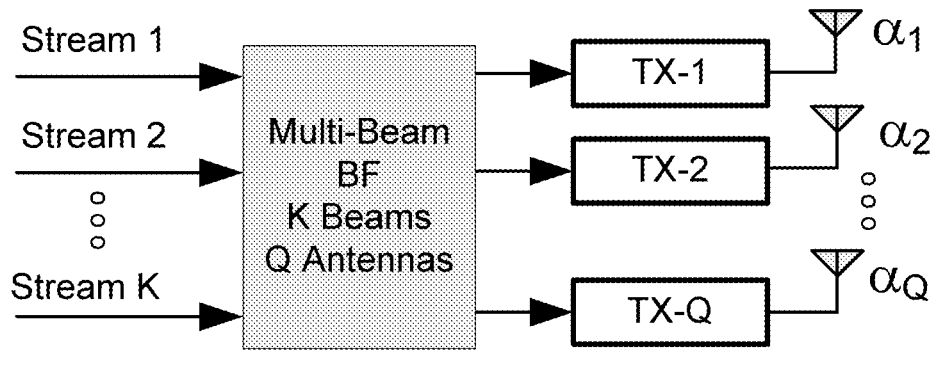
FIGS. 5A-5C provide exemplary illustrations of three types of beamforming.
Figure 5B:
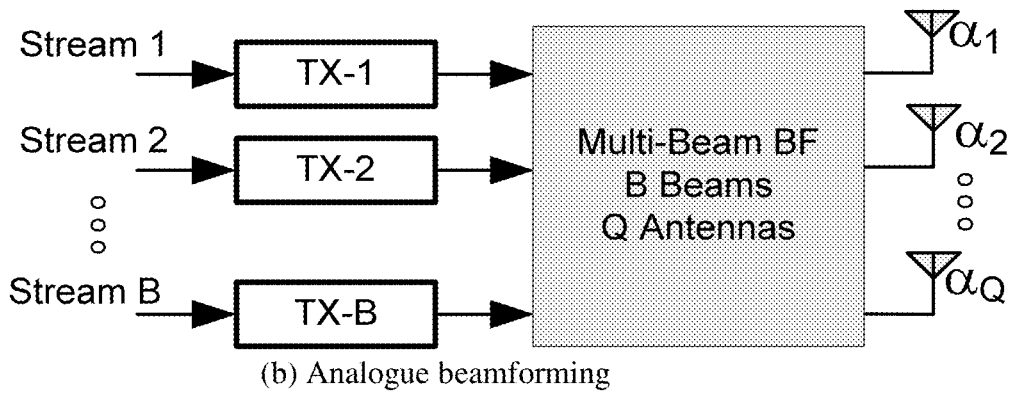
Figure 5C:
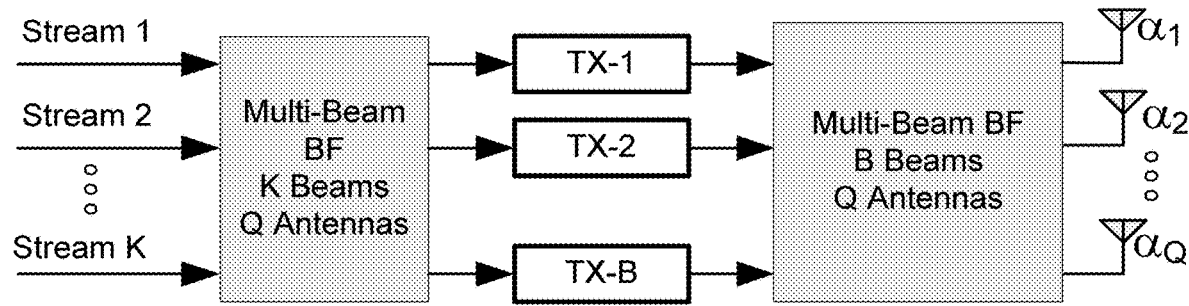
Figure 5C:
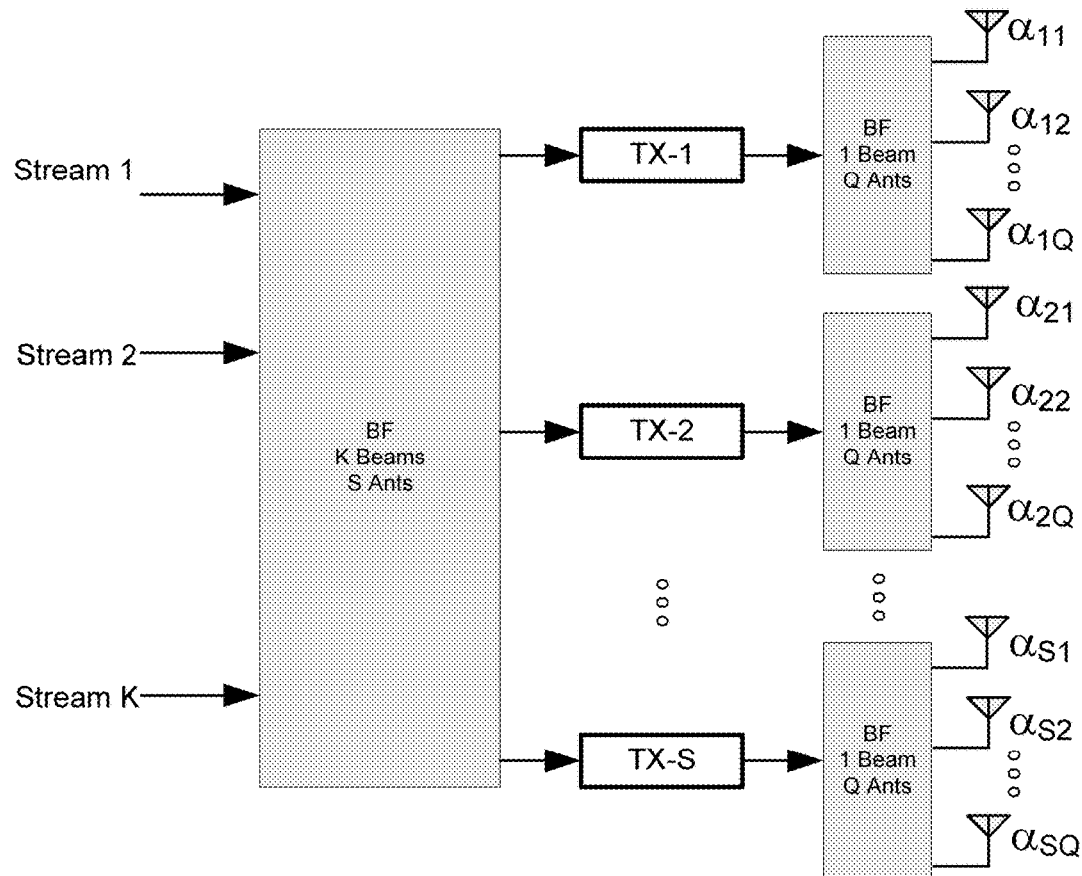

FIGS. 5A-5C provide exemplary illustrations of the three types of beamforming.

Figure 6:
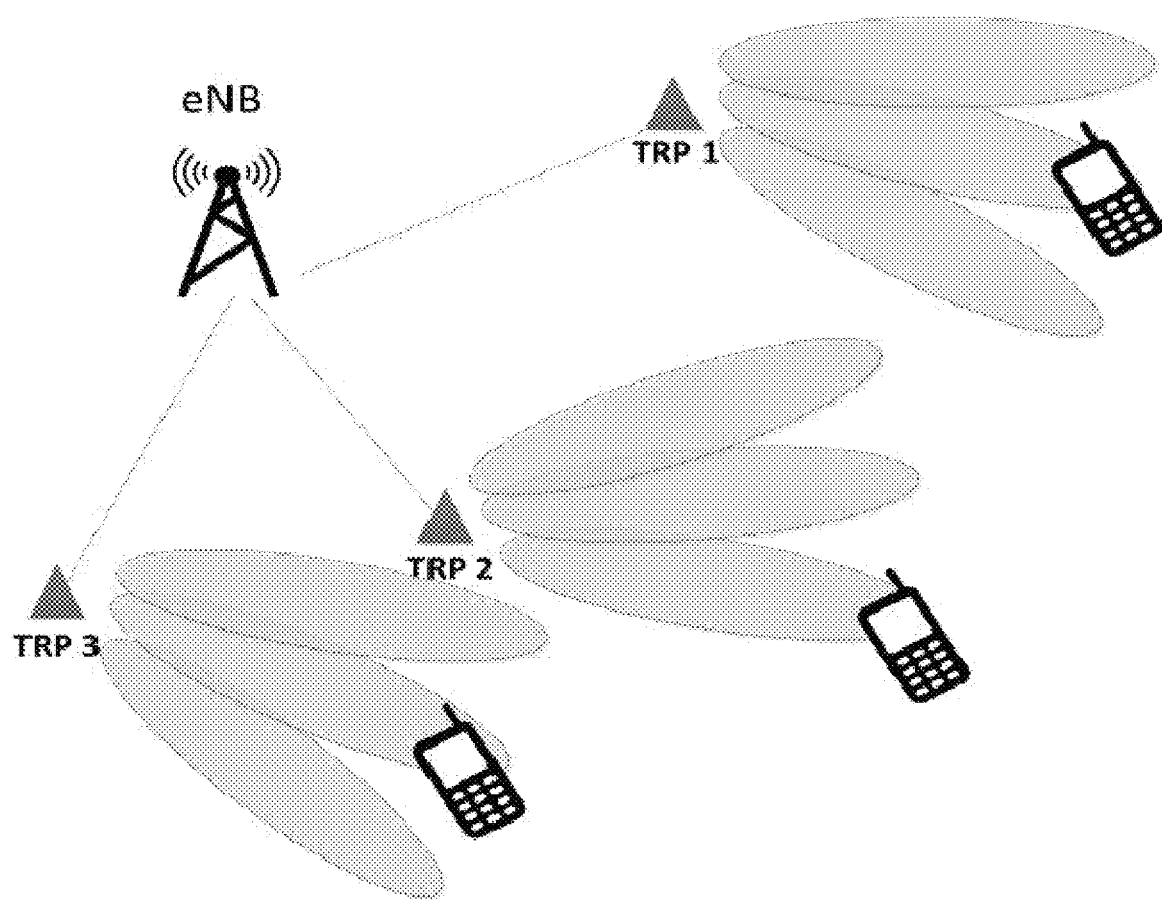
FIG. 6 is a reproduction of FIG. 1 of 3GPP R2-162709.

Based on 3GPP R2-162709 and as shown in FIG. 6, an eNB may have multiple TRPs (either centralized or distributed). Each TRP (Transmission/Reception Point) can form multiple beams. The number of beams and the number of simultaneous beams in the time/frequency domain depend on the number of antenna array elements and the RF (Radio Frequency) at the TRP.

Potential mobility type for NR can be listed as follows:
  Intra-TRP mobility
  Inter-TRP mobility
  Inter-NR eNB mobility Based on 3GPP R2-162762, reliability of a system purely relying on beamforming and operating in higher frequencies might be challenging, since the coverage might be more sensitive to both time and space variations. As a consequence of that the SINR (Signal to Interference Plus Noise Ratio) of that narrow link can drop much quicker than in the case of LTE.

Using antenna arrays at access nodes with the number of elements in the hundreds, fairly regular grid-of-beams coverage patterns with tens or hundreds of candidate beams per node may be created. The coverage area of an individual beam from such array may be small, down to the order of some tens of meters in (angular) width. As a consequence, channel quality degradation outside the current serving beam area is quicker than in the case of wide area coverage, as provided by LTE.

Figure 7:
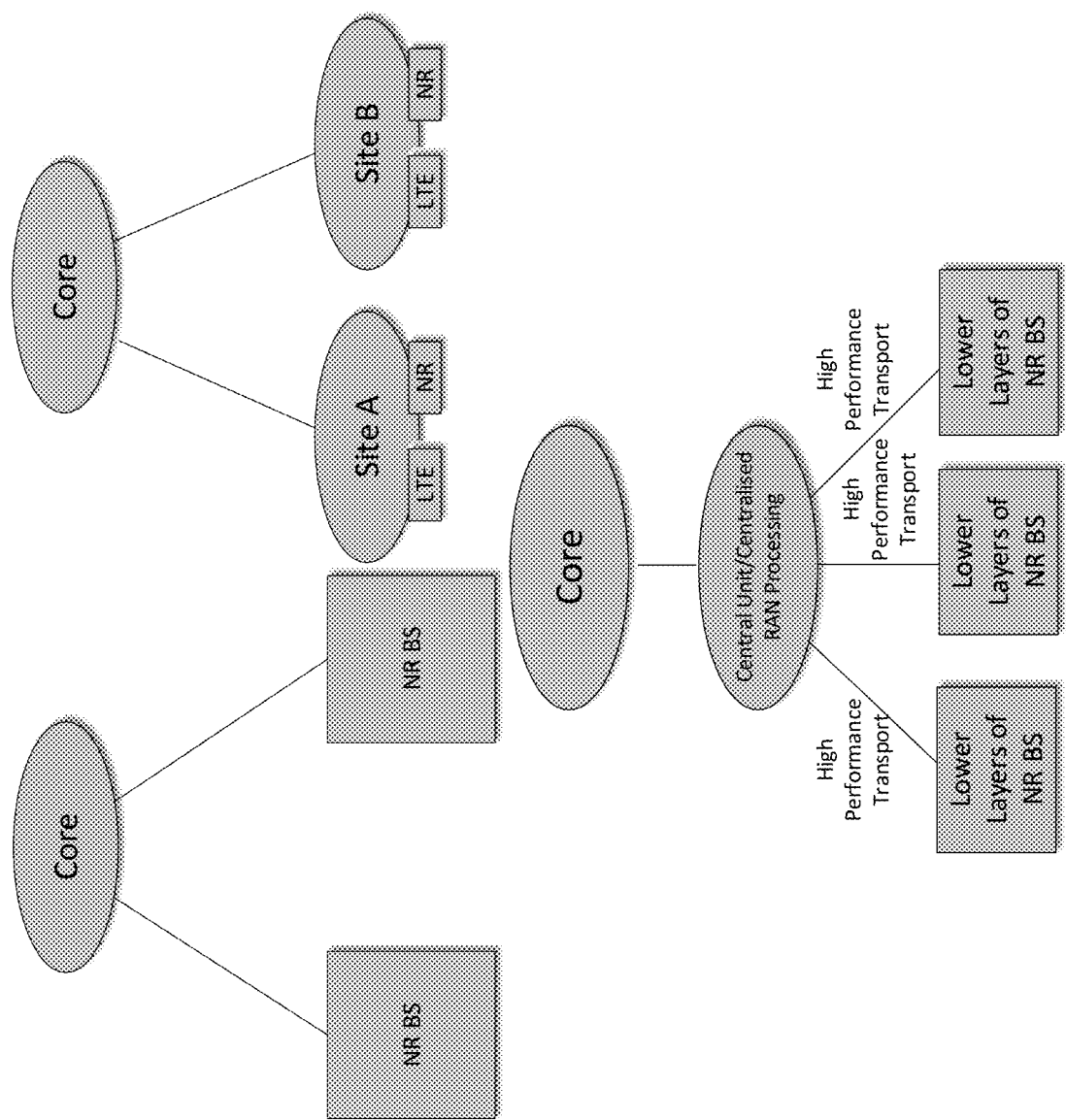
FIGS. 7 and 8 are reproduction of figures of 3GPP R2-160947.
Figure 8:
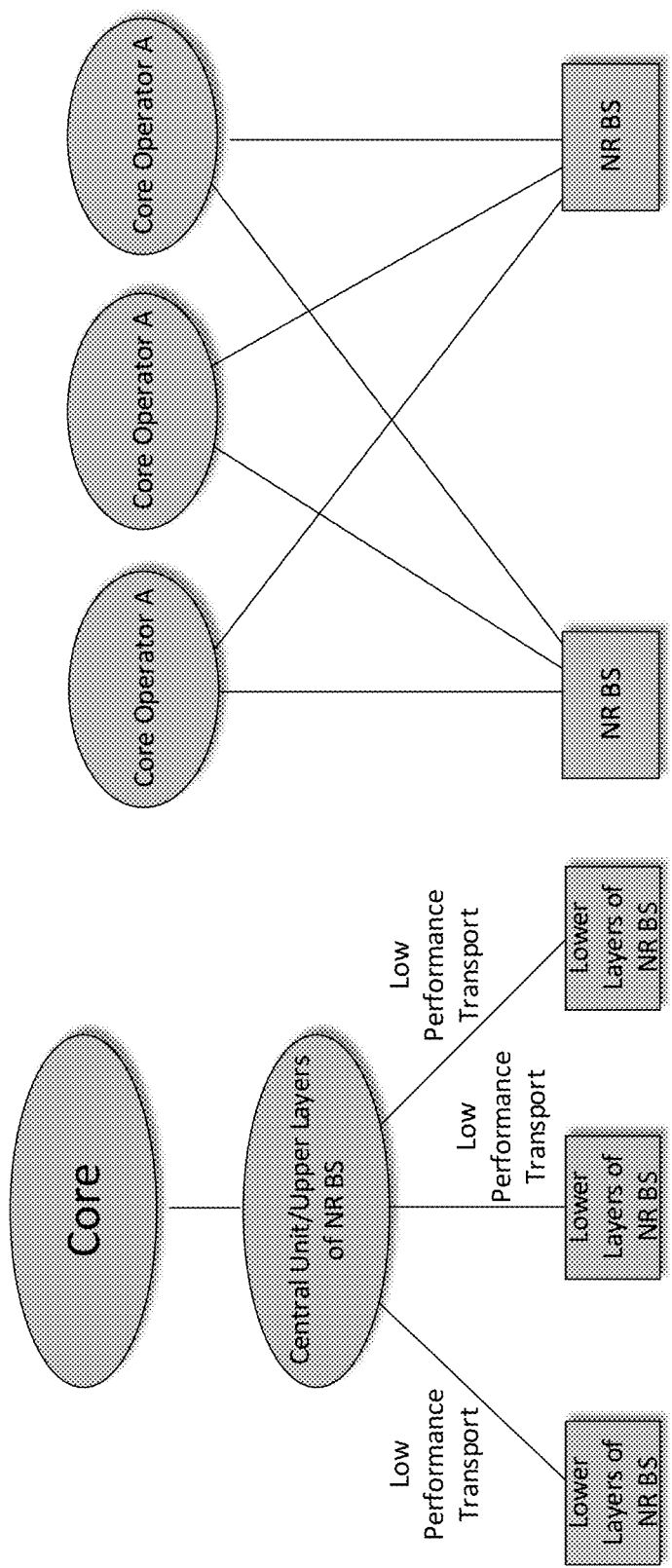

Based on 3GPP R3-160947, the scenarios illustrated in FIGS. 7 and 8 should be considered for support by the NR radio network architecture.

Based on 3GPP R2-164306, the following scenarios in terms of cell layout for standalone NR are captured to be studied:

Macro cell only deployment
Heterogeneous deployment
Small cell only deployment

Based on 3GPP RAN2 #94 meeting minutes, 1 NR eNB corresponds to 1 or many TRPs. Two levels of network controlled mobility:

RRC driven at "cell" level.
Zero/Minimum RRC involvement (e.g. at MAC/PHY)

Figure 9:
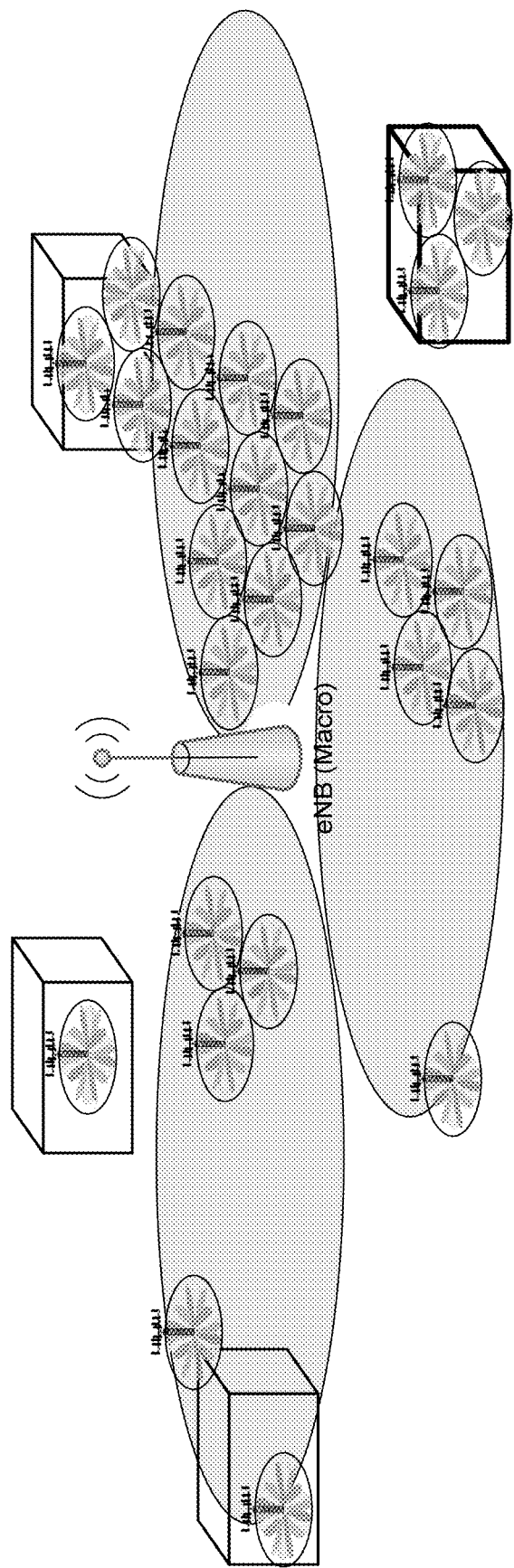
FIG. 9 shows an exemplary deployment with single TRP cell.
Figure 10:
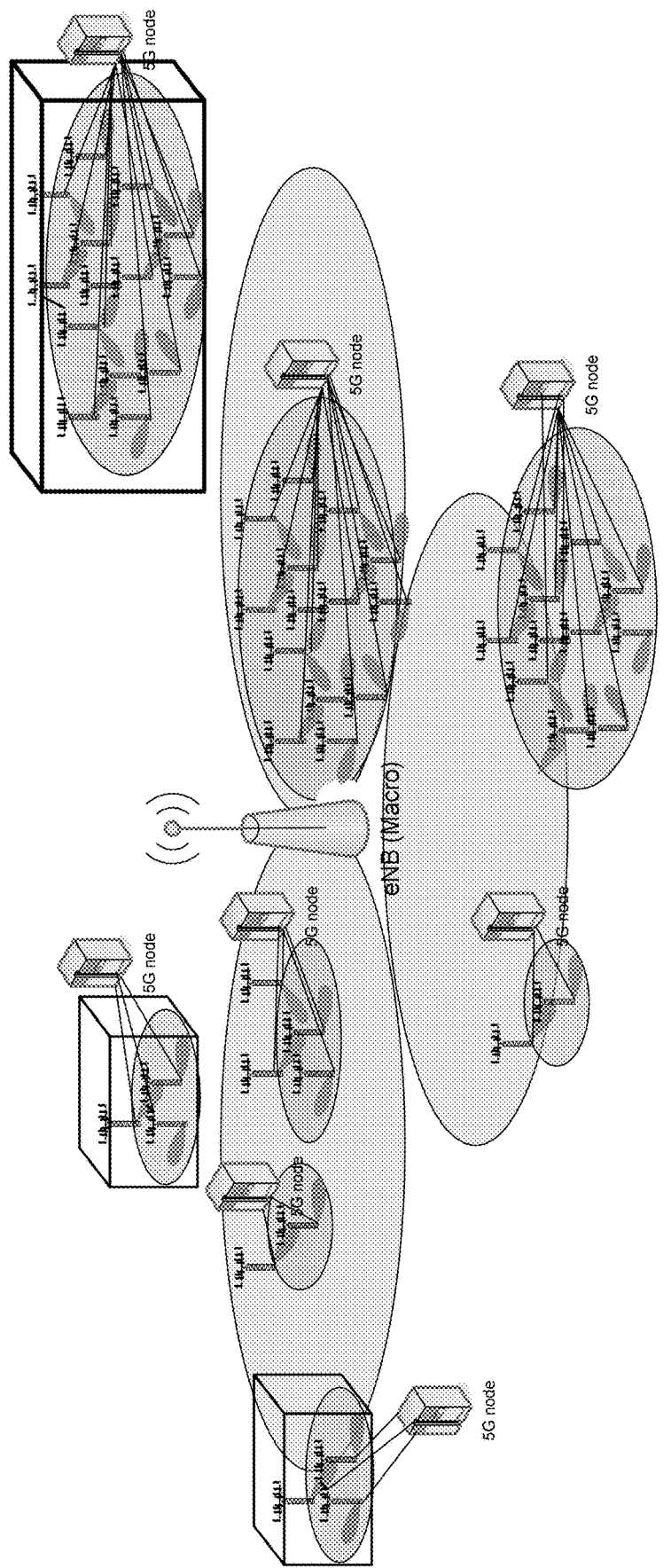
FIG. 10 shows an exemplary deployment with multiple TRP cells.
Figure 11:
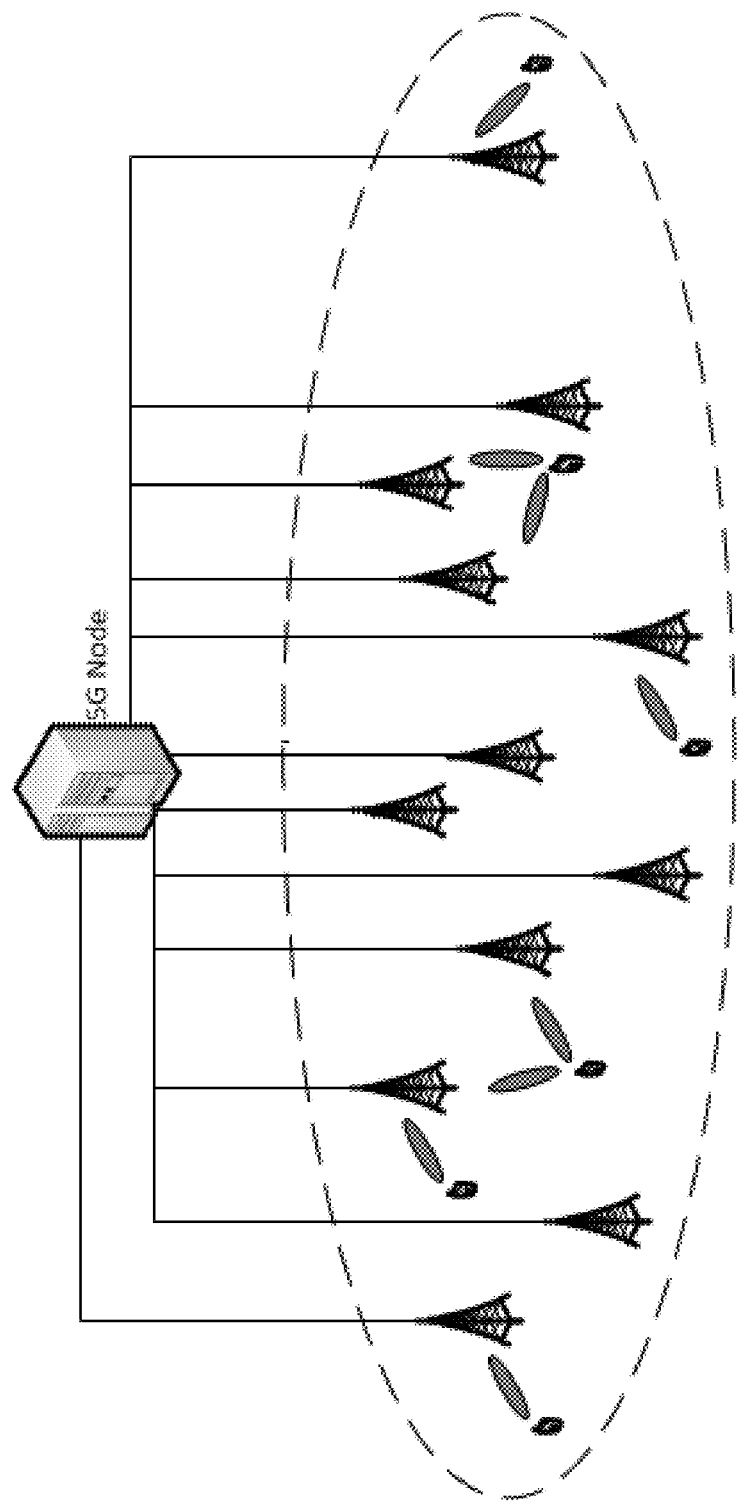
FIG. 11 shows an exemplary 5G cell comprising a 5G node with multiple TRPs.
Figure 12:
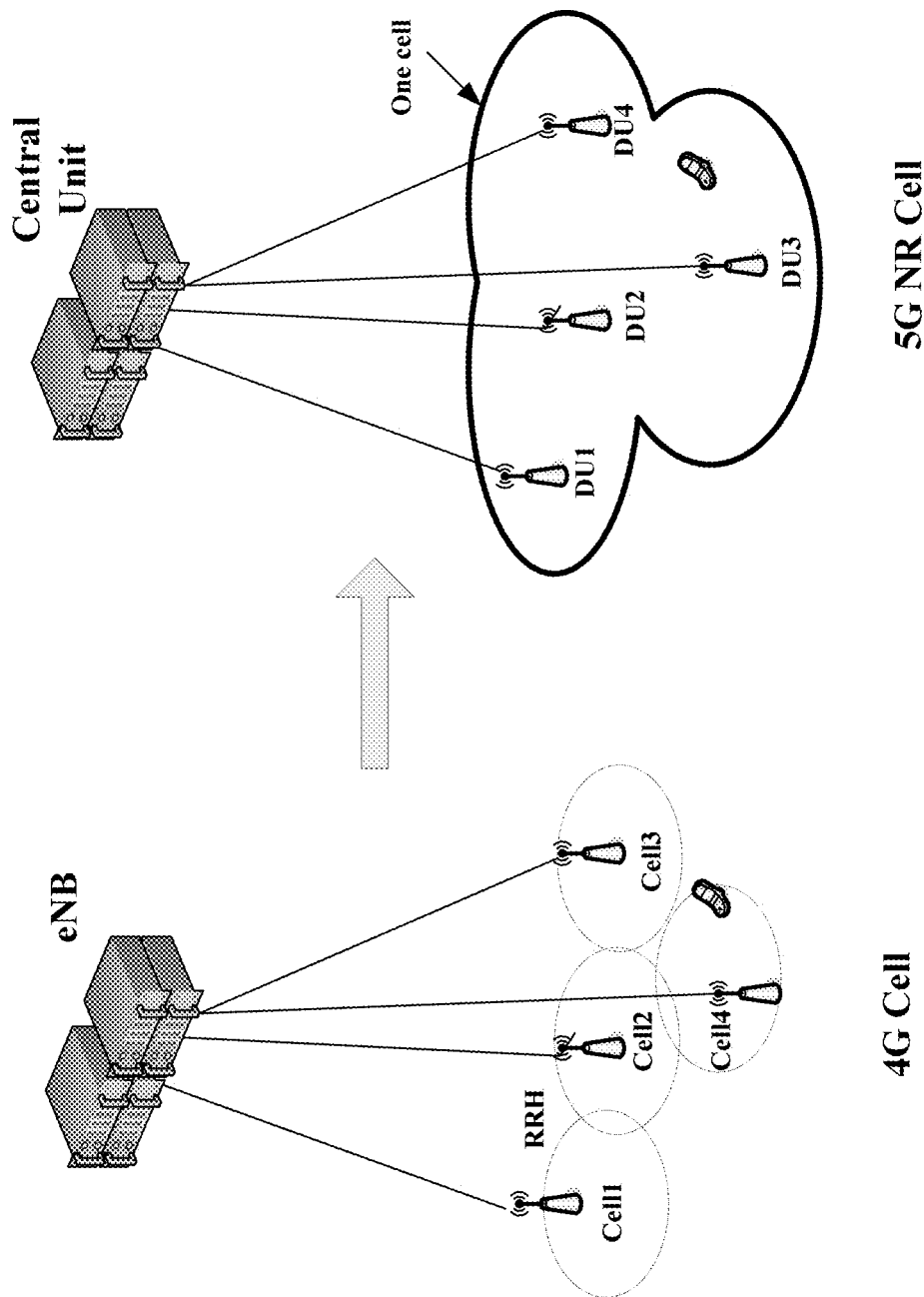
FIG. 12 shows an exemplary comparison between a LTE cell and a NR cell.

FIGS. 9 to 12 show some examples of the concept of a cell in 5G NR. FIG. 9 is a reproduction of a portion of FIG. 1 of 3GPP R2-163879, and shows exemplary different deployment scenarios with single TRP cell. FIG. 10 is a reproduction of a portion of FIG. 1 of 3GPP R2-163879, and shows exemplary different deployment scenarios with multiple TRP cells. FIG. 11 is a reproduction of FIG. 3 of 3GPP R2-162210, and shows an exemplary 5G cell comprising a 5G node with multiple TRPs. FIG. 12 is a reproduction of FIG. 1 of 3GPP R2-163471, and shows an exemplary comparison between a LTE cell and a NR cell.

3GPP TS 36.213 specifies the UE procedure for determining the subset of resources to be reported to higher layers in PSSCH (Physical Sidelink Shared Channel) resource selection in sidelink transmission mode 4 as follows:

14.1.1.6 UE procedure for determining the subset of resources to be reported to higher layers in PSSCH resource selection in sidelink transmission mode 4

When requested by higher layers in subframe n, the UE shall determine the set of resources to be reported to higher layers for PSSCH transmission according to the following steps. Parameters $L_{subCH}$ the number of sub-channels to be used for the PSSCH transmission in a subframe, $P_{rsvp\_TX}$ the resource reservation interval, and $prio_{TX}$ the priority to be transmitted in the associated SCI format 1 by the UE are all provided by higher layers. $C_{resel}$ is determined according to Subclause 14.1.1.4B.

If partial sensing is not configured by higher layers then the following steps are used:

1) A candidate single-subframe resource for PSSCH transmission $R_{x,y}$ is defined as a set of $L_{subCH}$ contiguous sub-channels with sub-channel $x+j$ in subframe $t_y^{SL}$ where $j=0, \ldots, L_{subCH}-1$. The UE shall assume that any set of $L_{subCH}$ contiguous sub-channels included in the corresponding PSSCH resource pool (described in 14.1.5) within the time interval $[n+T_1, n+T_2]$ corresponds to one candidate single-subframe resource, where selections of $T_1$ and $T_2$ are up to UE implementations under $T_1 \leq 4$ and $20 \leq T_2 \leq 100$. UE selection of $T_2$ shall fulfil the latency requirement. The total number of the candidate single-subframe resources is denoted by $M_{total}$.

2) The UE shall monitor subframes $t_{n'-10 \times P_{step}}^{SL}$, $t_{n'-10 \times P_{step}+1}^{SL}, \ldots, t_{n'-1}^{SL}$ except for those in which its transmissions occur, where $t_{n'}^{SL}=n$ if subframe n belongs to the set $(t_0^{SL}, t_1^{SL}, \ldots, t_{T_{max}}^{SL})$, otherwise subframe $t_{n'}^{SL}$ is the first subframe after subframe n belonging to the set $(t_0^{SL}, t_1^{SL}, \ldots, t_{T_{max}}^{SL})$. The UE shall perform the behaviour in the following steps based on PSCCH decoded and S-RSSI measured in these subframes.

3) The parameter $Th_{a,b}$ is set to the value indicated by the i-th SL-ThresPSSCH-RSRP field in SL-ThresPSSCH-RSRP-List where $i=a*8+b+1$.

4) The set $S_A$ is initialized to the union of all the candidate single-subframe resources. The set $S_B$ is initialized to an empty set.

5) The UE shall exclude any candidate single-subframe resource $R_{x,y}$ from the set $S_A$ if it meets all the following conditions:

the UE has not monitored subframe $t_z^{SL}$ in Step 2.
there is an integer j which meets $y+j \times P'_{rsvp\_TX}=z+P_{step} \times k \times q$ where $j=0, 1, \ldots, C_{resel}-1$, $P'_{rsvp\_TX}=P_{step} \times P_{rsvp\_TX}/100$, k is any value allowed by the higher layer parameter restrictResourceReservationPeriod and $q=1, 2, \ldots, Q$. Here, $$Q = \frac{1}{k}$$

if $k<1$ and $n'-z \leq P_{step} \times k$, where $t_{n'}^{SL}=n$ if subframe n belongs to the set $t_0^{SL}, t_1^{SL}, \ldots, t_{T_{max}}^{SL}$ otherwise subframe $t_{n'}^{SL}$ is the first subframe belonging to the set $t_0^{SL}, t_1^{SL}, \ldots, t_{T_{max}}^{SL}$, after subframe n; and $Q=1$ otherwise.

6) The UE shall exclude any candidate single-subframe resource $R_{x,y}$ from the set $S_A$ if it meets all the following conditions:

the UE receives an SCI format 1 in subframe $t_m^{SL}$, and "Resource reservation" field and "Priority" field in the received SCI format 1 indicate the values $P_{rsvp\_RX}$ and $prio_{RX}$, respectively according to Subclause 14.2.1.

PSSCH-RSRP measurement according to the received SCI format 1 is higher than $Th_{prio_{TX}, prio_{RX}}$.

the SCI format received in subframe $t_m^{SL}$ or the same SCI format 1 which is assumed to be received in subframe(s) $t_{m+q \times P_{step} \times P_{rsvp\_RX}}^{SL}$ determines according to 14.1.1.4C the set of resource blocks and subframes which overlaps with $R_{x,y+j \times P'_{rsvp\_TX}}$ for $q=1, 2, \ldots, Q$ and $j=0, 1, \ldots, C_{resel}-1$. Here, $$Q = \frac{1}{P_{rsvp\_RX}}$$

if $P_{rsvp\_RX}<1$ and $n'-m \leq P_{step} \times P_{rsvp\_RX}$ where $t_{n'}^{SL}=n$ if subframe n belongs to the set $(t_0^{SL}, t_1^{SL}, \ldots, t_{T_{max}}^{SL})$, otherwise subframe $t_{n'}^{SL}$ is the first subframe after subframe n belonging to the set $(t_0^{SL}, t_1^{SL}, \ldots, t_{T_{max}}^{SL})$; otherwise $Q=1$.

7) If the number of candidate single-subframe resources remaining in the set $S_A$ is smaller than $0.2 \cdot M_{total}$, then Step 4 is repeated with $Th_{a,b}$ increased by 3 dB.

8) For a candidate single-subframe resource $R_{x,y}$ remaining in the set $S_A$, the metric $E_{x,y}$ is defined as the linear average of S-RSSI measured in sub-channels $x+k$ for $k=0, \ldots, L_{subCH}-1$ in the monitored subframes in Step 2 that can be expressed by $t_{y-P_{step}*j}^{SL}$ for a non-negative integer j if $P_{rsvp\_TX} \geq 100$, and $t_{y-P_{rsvp\_TX}*j}^{SL}$ for a non-negative integer j otherwise.

9) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to $0.2 \cdot M_{total}$.

The UE shall report set $S_B$ to higher layers.

If partial sensing is configured by higher layers then the following steps are used:

1) A candidate single-subframe resource for PSSCH transmission $R_{x,y}$ is defined as a set of $L_{subCH}$ contiguous sub-channels with sub-channel x+j in subframe $t_y^{SL}$ where j=0, ... $L_{subCH}$−1. The UE shall determine by its implementation a set of subframes which consists of at least Y subframes within the time interval [n+T$_1$, n+T$_2$] where selections of T$_1$ and T$_2$ are up to UE implementations under T$_1$≤4 and 20≤T$_2$≤100. UE selection of T$_2$ shall fulfil the latency requirement and Y shall be greater than or equal to the high layer parameter minNumCandidateSF. The UE shall assume that any set of $L_{subCH}$ contiguous sub-channels included in the corresponding PSSCH resource pool (described in 14.1.5) within the determined set of subframes correspond to one candidate single-subframe resource. The total number of the candidate single-subframe resources is denoted by $M_{total}$.

2) If a subframe $t_y^{SL}$ is included in the set of subframes in Step 1, the UE shall monitor any subframe $t_{y-k \times P_{step}}^{SL}$ if k-th bit of the high layer parameter gapCandidateSensing is set to 1. The UE shall perform the behaviour in the following steps based on PSCCH decoded and S-RSSI measured in these subframes.

3) The parameter $Th_{a,b}$ is set to the value indicated by the i-th SL-ThresPSSCH-RSRP field in SL-ThresPSSCH-RSRP-List where i=a*8+b+1.

4) The set $S_A$ is initialized to the union of all the candidate single-subframe resources. The set $S_B$ is initialized to an empty set.

5) The UE shall exclude any candidate single-subframe resource $R_{x,y}$ from the set $S_A$ if it meets all the following conditions:

the UE receives an SCI format 1 in subframe $t_m^{SL}$, and "Resource reservation" field and "Priority" field in the received SCI format 1 indicate the values $P_{rsvp\_TX}$ and $prio_{RX}$, respectively according to Sub-clause 14.2.1.

PSSCH-RSRP measurement according to the received SCI format 1 is higher than $Th_{prio_{TX},prio_{RX}}$.

the SCI format received in subframe $t_m^{SL}$ or the same SCI format 1 which is assumed to be received in subframe(s) $t_{m+z \times P_{step} \times P_{rsvp\_RX}}^{SL}$ determines according to 14.1.1.4C the set of resource blocks and subframes which overlaps with $R_{x,y+j \times P_{rsvp\_TX}}$ for q=1, 2, . . . , Q and j=0, 1, . . . , $C_{resel}$−1. Here, $$Q = \frac{1}{P_{rsvp\_RX}}$$

if $P_{rsvp\_RX}$<1 and y'−m≤$P_{step} \times P_{rsvp\_RX}+P_{step}$, where $t_{y'}^{SL}$ is the last subframe of the Y subframes, and Q=1 otherwise.

6) If the number of candidate single-subframe resources remaining in the set $S_A$ is smaller than 0.2·$M_{total}$, then Step 4 is repeated with $Th_{a,b}$ increased by 3 dB.

7) For a candidate single-subframe resource $R_{x,y}$ remaining in the set $S_A$, the metric $E_{x,y}$ is defined as the linear average of S-RSSI measured in sub-channels x+k for k=0, . . . , $L_{subCH}$−1 in the monitored subframes in Step 2 that can be expressed by $t_{y-P_{step}*j}^{SL}$ for a non-negative integer j.

8) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to 0.2·$M_{total}$.

The UE shall report set $S_B$ to higher layers.

3GPP TS 36.214 specifies some measurements for sidelink transmission as follows:

5.1.28 Sidelink Received Signal Strength Indicator (S-RSSI)

| | |
|---|---|
| Definition | Sidelink RSSI (S-RSSI) is defined as the linear average of the total received power (in [W]) per SC-FDMA symbol observed by the UE only in the configured sub-channel in SC-FDMA symbols 1, 2, . . . , 6 of the first slot and SC-FDMA symbols 0, 1, . . . , 5 of the second slot of a subframe<br>The reference point for the S-RSSI shall be the antenna connector of the UE.<br>If receiver diversity is in use by the UE, the reported value shall not be lower than the corresponding S-RSSI of any of the individual diversity branches |
| Applicable for | RRC__IDLE intra-frequency,<br>RRC__IDLE inter-frequency,<br>RRC__CONNECTED intra-frequency,<br>RRC__CONNECTED inter-frequency |

5.1.29 PSSCH Reference Signal Received Power (PSSCH-RSRP)

| | |
|---|---|
| Definition | PSSCH Reference Signal Received Power (PSSCH-RSRP) is defined as the linear average over the power contributions (in [W]) of the resource elements that carry demodulation reference signals associated with PSSCH, within the PRBs indicated by the associated PSCCH.<br>The reference point for the PSSCH-RSRP shall be the antenna connector of the UE.<br>If receiver diversity is in use by the UE, the reported value shall not be lower than the corresponding PSSCH-RSRP of any of the individual diversity branches |
| Applicable for | RRC__IDLE intra-frequency,<br>RRC__IDLE inter-frequency,<br>RRC__CONNECTED intra-frequency,<br>RRC__CONNECTED inter-frequency |

NOTE: The power per resource element is determined from the energy received during the useful part of the symbol, excluding the CP.

One or multiple of following terminologies may be used hereafter:

BS: A network central unit or a network node in NR which is used to control one or multiple TRPs which are associated with one or multiple cells. Communication between BS and TRP(s) is via fronthaul. BS could also be referred to as central unit (CU), eNB, gNB, or NodeB.

TRP: A transmission and reception point provides network coverage and directly communicates with UEs. TRP could also be referred to as distributed unit (DU) or network node.

Cell: A cell is composed of one or multiple associated TRPs, i.e. coverage of the cell is composed of coverage of all associated TRP(s). One cell is controlled by one BS. Cell could also be referred to as TRP group (TRPG).

Beam sweeping: In order to cover all possible directions for transmission and/or reception, a number of beams is required. Since it is not possible to generate all these beams concurrently, beam sweeping means to generate a subset of these beams in one time interval and change generated beam(s) in other time interval(s), i.e. changing beam in time domain. So, all possible directions can be covered after several time intervals.

Beam sweeping number: A necessary number of time interval(s) to sweep beams in all possible directions once for transmission and/or reception. In other words, a signaling applying beam sweeping would be transmitted "beam sweeping number" of times within one time period, e.g.

the signaling is transmitted in (at least partially) different beam(s) in different times of the time period.

Serving beam: A serving beam for a UE is a beam generated by a network node, e.g. TRP, which is currently used to communicate with the UE, e.g. for transmission and/or reception.

Candidate beam: A candidate beam for a UE is a candidate of a serving beam. Serving beam may or may not be candidate beam.

Qualified beam: A qualified beam is a beam with radio quality, based on measuring signal on the beam, better than a threshold.

The best serving beam: The serving beam with the best quality (e.g. the highest BRSRP value).

The worst serving beam: The serving beam with the worst quality (e.g. the worst BRSRP value).

NR-PDCCH: A channel carries downlink control signal which is used to control communication between a UE and a network side. A network transmits NR-PDCCH on configured control resource set (CORESET) to the UE.

UL-control signal: An UL-control signal may be scheduling request (SR), channel state information (CSI), HARQ-ACK/NACK for downlink transmission Slot: a scheduling unit in NR. Slot duration is 14 OFDM symbols.

Mini-slot: A scheduling unit with duration less than 14 OFDM symbols.

Slot format information (SFI): Information of slot format of symbols in a slot. A symbol in a slot may belong to following type: downlink, uplink, unknown or other. The slot format of a slot could at least convey transmission direction of symbols in the slot.

DL common signal: Data channel carrying common information that targets for multiple UEs in a cell or all UEs in a cell. Examples of DL common signal could be system information, paging, RAR.

DL URLLC: A type of DL transmission which requires very high reliability and very low latency. To fulfill the latency requirement, an example is to transmit DL URLLC in a mini-slot, e.g. the data duration could be less than 1 slot such as 1~4 OFDM symbol(s) and there may be one or multiple monitoring occasions for DL URLLC control in a slot. In this example, a UE is configured with a CORESET to monitor for DL URLLC control indicating DL URLLC transmission. The CORESET can be configured on middle symbol of a slot. The DL URLLC transmission may be transmitted on the following few symbols of the CORESET.

One or multiple of following assumptions for network side may be used hereafter:

NR using beamforming could be standalone, i.e. UE can directly camp on or connect to NR.
  NR using beamforming and NR not using beamforming could coexist, e.g. in different cells.
TRP would apply beamforming to both data and control signaling transmissions and receptions, if possible and beneficial.
  Number of beams generated concurrently by TRP depends on TRP capability, e.g. maximum number of beams generated concurrently by different TRPs may be different.
  Beam sweeping is necessary, e.g. for the control signaling to be provided in every direction.
  (For hybrid beamforming) TRP may not support all beam combinations, e.g. some beams could not be generated concurrently. FIG. 18 shows an example for combination limitation of beam generation.

Downlink timing of TRPs in the same cell are synchronized.
RRC layer of network side is in BS.
TRP should support both UEs with UE beamforming and UEs without UE beamforming, e.g. due to different UE capabilities or UE releases.

Figure 13:
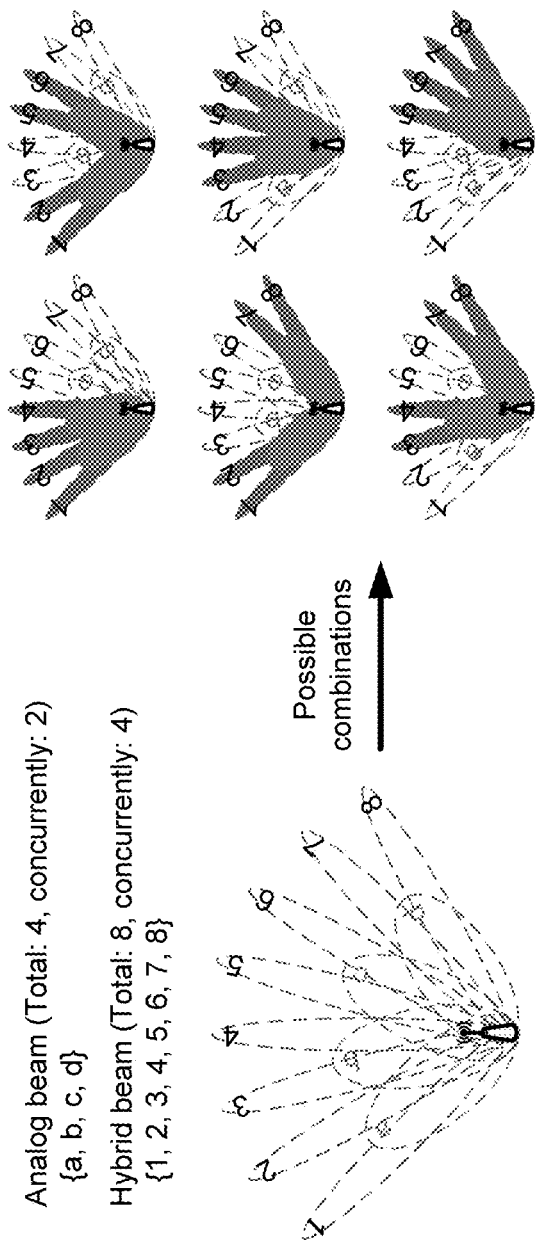
FIG. 13 shows an exemplary combination limitation of beam generation.

One or multiple of following assumptions for UE side may be used hereafter:

UE may perform beamforming for reception and/or transmission, if possible and beneficial.
  Number of beams generated concurrently by UE depends on UE capability, e.g. generating more than one beam is possible.
  Beam(s) generated by UE is wider than beam(s) generated by TRP, gNB, or eNB.
  Beam sweeping for transmission and/or reception is generally not necessary for user data but may be necessary for other signaling, e.g. to perform measurement.
  (For hybrid beamforming) UE may not support all beam combinations, e.g. some beams could not be generated concurrently. FIG. 13 shows an example of combination limitation of beam generation.
Not every UE supports UE beamforming, e.g. due to UE capability or UE beamforming is not supported in NR first (few) release(s).
One UE is possible to generate multiple UE beams concurrently and to be served by multiple serving beams from one or multiple TRPs of the same cell.
  Same or different (DL or UL) data could be transmitted on the same radio resource via different beams for diversity or throughput gain.
There are at least two UE (RRC) states: connected state (or called active state) and non-connected state (or called inactive state or idle state). Inactive state may be an additional state or belong to connected state or non-connected state.

Figure 14:
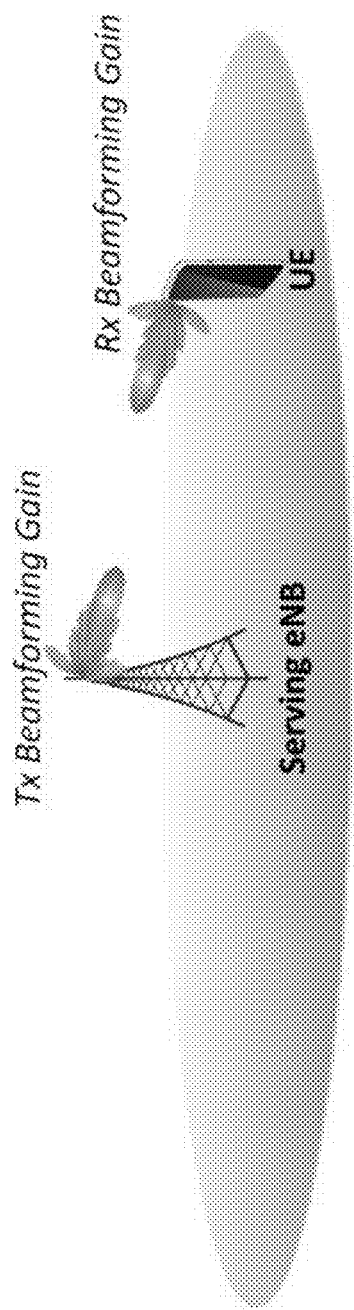
FIG. 14 is a reproduction of FIG. 3 of 3GPP R2-162251.

Based on 3GPP R2-162251, to use beamforming in both eNB and UE sides, practically, antenna gain by beamforming in eNB is considered about 15 to 30 dBi and the antenna gain of UE is considered about 3 to 20 dBi. FIG. 14 (a reproduction of FIG. 3 of 3GPP R2-162251) illustrates gain compensation by beamforming.

Figure 15:
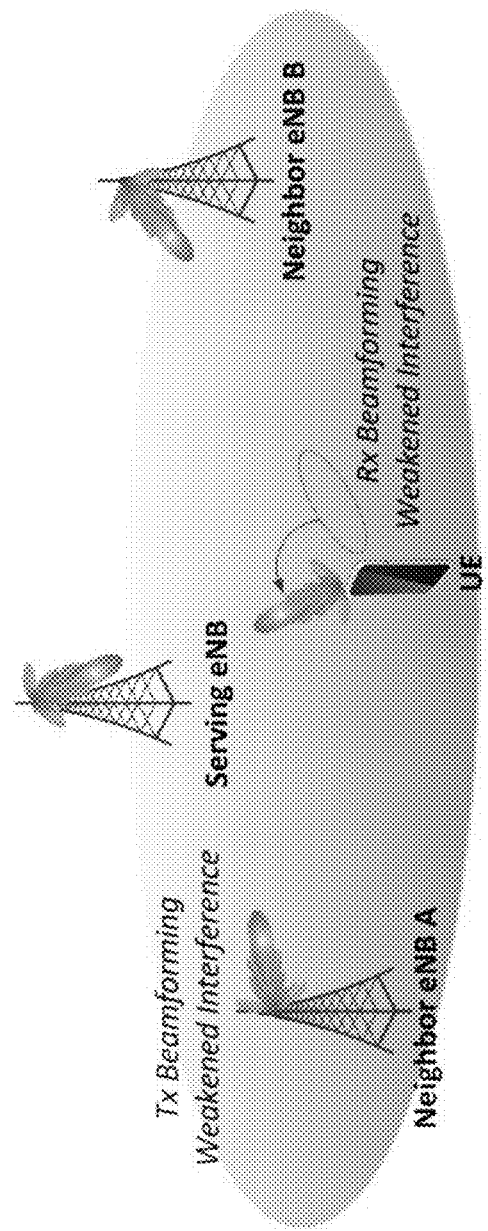
FIG. 15 is a reproduction of FIG. 4 of 3GPP R2-162251.

From the SINR perspective, sharp beamforming reduces interference power from neighbor interferers, i.e. neighbor eNBs in downlink case or other UEs connected to neighbor eNBs. In TX beamforming case, only interference from other TXs whose current beam points the same direction to the RX will be the "effective" interference. The "effective" interference means that the interference power is higher than the effective noise power. In RX beamforming case, only interference from other TXs whose beam direction is the same to the UE's current RX beam direction will be the effective interference. FIG. 15 (a reproduction of FIG. 4 of 3GPP R2-162251) illustrates a weakened interference by beamforming.

For LTE V2X and/or P2X transmission, there are at least two transmission modes: one is scheduled via network, such as sidelink transmission mode 3 (as discussed in 3GPP TS 36.213); the other one is sensing-based transmission, such as sidelink transmission mode 4 [9] (as discussed in 3GPP TS 36.213). Since the sensing-based transmission is not scheduled via network, the UE requires performing sensing before selecting a resource for transmission, in order to avoid resource collision and interference from or in other UEs.

For the sensing-based resource selection procedure, as an instance shown in FIG. 12, the UE have a candidate resource set comprising multiple candidate resources. The available candidate resource set is restricted with time interval [n+$T_1$, n+T$_2$]. The restricted time interval may be different depending on whether partially sensing is configure or not. Full sensing may mean that partially sensing is not configured. Preferably, a candidate resource may mean one candidate single-subframe resource. One candidate resource may comprise one or multiple resource units. The resource unit may be a subchannel. Preferably, the resource unit may comprise multiple (physical) resource blocks in a TTI. The TTI may be a subframe.

Based on sensing within a sensing duration, the UE may generate a valid resource set, wherein the valid resource set is a subset of the candidate resource set. The generation of the valid resource set may be performed via excluding some candidate resources from the candidate resource set, for instance the step 2-1 and step 2-2 shown in FIG. 16. The generation of the valid resource set may be performed via selecting some valid candidate resources, for instance the step 3-1 shown in FIG. 16. Then, the UE selects one or some valid resources from the valid resource set to perform transmission from the UE. The valid resource selection for transmission may be randomly selected from the valid resource set, for instance the step 3-2 shown in FIG. 16.

As discussed in 3GPP TS 36.213, the first excluding step is that if the UE does not monitor/sense a TTI z, the UE cannot expect whether the candidate resources in TTI "z+P$_{any}$" are occupied or not, wherein P$_{any}$ means any possible periodicity for transmission. For instance, the first excluding step is shown as the step 2-1 in FIG. 16. For the case of P$_{any}$>=100 ms, the UE excludes the candidate resources in TTI "z+P$_{any}$" and excludes the candidates resources for which the UE may have possible transmission occurred in TTI "z+P$_{any}$". For the case of P$_{any}$<100 ms, the UE excludes the candidate resources in TTI "z+q·P$_{any}$" and excludes the candidates resources for which the UE may have possible transmission occurred in TTI "z+q·P$_{any}$", wherein q is 1, 2, . . . , 100/P$_{any}$. The parameter q means that the UE excludes multiple candidate resources with period P$_{any}$ within time interval [z, z+100]. The possible transmission may mean a transmission on a selected valid resource. The possible transmission may also mean a periodic transmission of a transmission on a selected valid resource. Moreover, P$_{any}$ means any possible periodicity configured by higher layer.

The second excluding step is that if the UE receives or detects a control signaling in a TTI m, the UE may exclude the candidate resources according to the received control signaling. For instance, the second excluding step is shown as the step 2-2 in FIG. 16. More specifically, if the UE receives or detects a control signaling scheduling a transmission in a TTI m and the measurement result of the scheduled transmission and/or the control signal is over a threshold, the UE may exclude the candidate resources according to the received control signaling. The measurement result may be RSRP. More specifically, the measurement result may be PSSCH-RSRP. The control signaling may indicate the resources of the scheduled transmission and/or periodicity of the scheduled transmission, P$_{RX}$.

The excluded candidate resources according to the received control signaling are the resources of next one scheduled transmission based on the resources of the scheduled transmission and periodicity of the scheduled transmission, such as for the case of P$_{RX}$>=100 ms. Moreover, the excluded candidate resources according to the received control signaling are the resources of next multiple scheduled transmissions based on the resources of the scheduled transmission and periodicity of the scheduled transmission, such as for the case of P$_{RX}$<100 ms. The next multiple scheduled transmissions may be with period P$_{RX}$ within time interval [m, m+100]. If the control signaling indicates that there is no next scheduled transmission or the control signaling indicates that the resource of scheduled transmission is not kept in next time or the control signaling indicates that the scheduled transmission is the last transmission from the UE transmitting the control signaling or the control signaling indicates that the periodicity of the scheduled transmission is indicated as zero, the UE may not exclude candidate resources according to the received control signaling.

Figure 16:
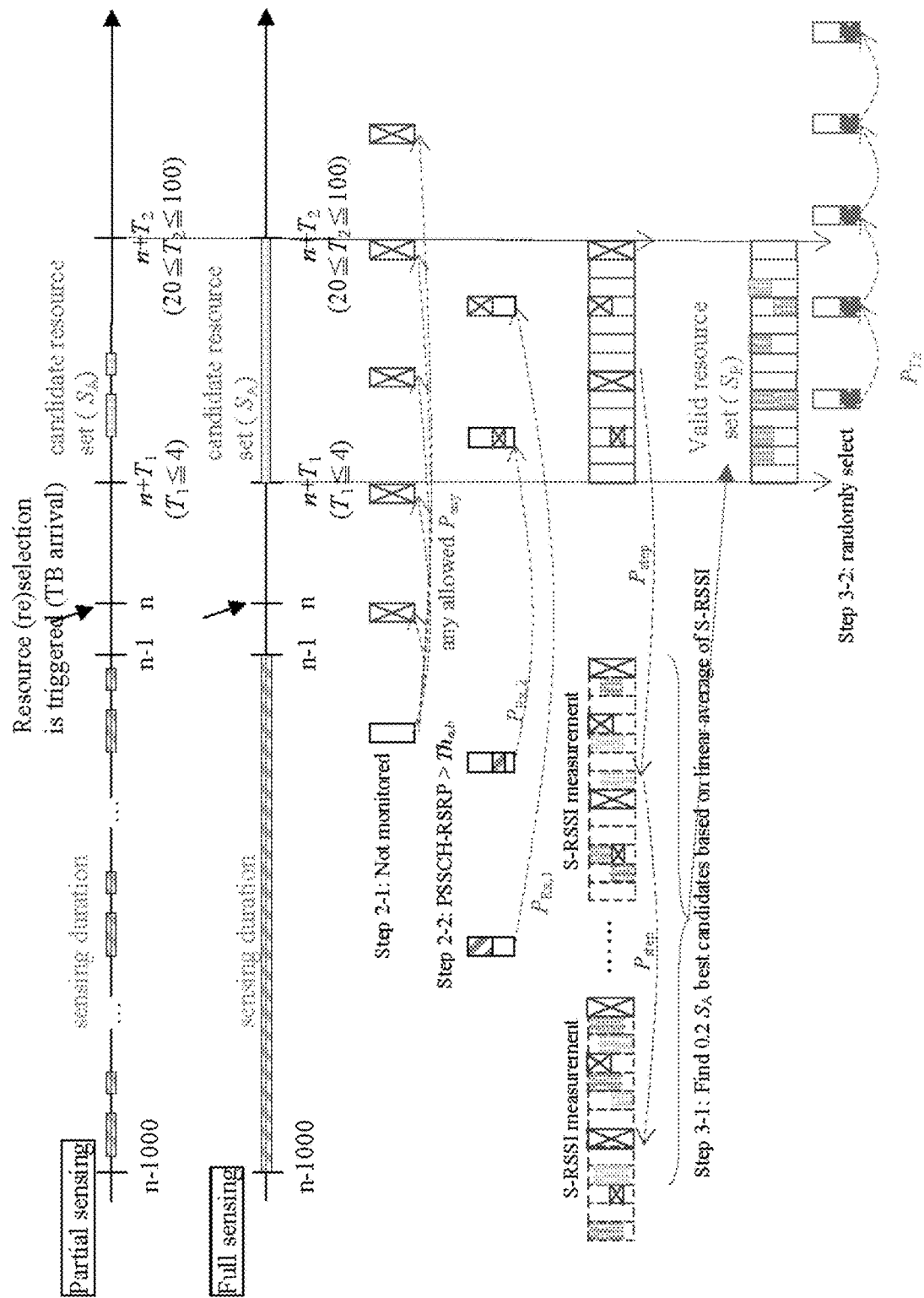
FIG. 16 is a diagram according to one exemplary embodiment.

After the first excluding step and the second excluding step, the UE may select some valid candidate resources from the remaining candidate resources, such as the step 3-1 shown in FIG. 16. The UE may measure resources in the sensing duration, wherein the measured resources are associated with the remaining candidate resources after the step 2-1 and step 2-2. More specifically, for a remaining candidate resource, the associated measured resources in the sensing duration are in the occasions with multiple times of a time period from the remaining candidate resources. For instance, if the time period is 100 TTIs, The associated measured resources in the sensing duration are in the TTI "n−j·100", j is positive integer, for a remaining candidate resource in TTI n. Moreover, the associated measured resources in the sensing duration are with the same frequency resources as the remaining candidate resource. More specifically, the measurement is S-RSSI measurement. Based on the measurement, the UE can derive metric for each remaining candidate resource. The metric for a remaining candidate resource may be linear average of S-RSSI measured from its associated measured resources in the sensing duration. Then, the UE may select valid candidate resources based on the metric of each remaining candidate resource.

In one embodiment, an action is that a remaining candidate resource with the smallest metric is selected as valid candidate resource and moved into a valid resource set. Repeating the action until the UE selects a number of remaining candidate resources as valid candidate resources and moves the number of remaining candidate resources into the valid resource set. For instance, the number is larger than or equal to 20% of total candidate resources. The number is larger than or equal to 20% of cardinality of the candidate resource set.

Based on the current (partially) sensing procedure, the UE can determine the valid resource set. The valid resource set may be reported to higher layers for transmission from the UE. The UE may select one or some valid resources from the valid resource set to perform transmission from the UE. The transmission from the UE may be PSSCH transmission.

In 5G NR, in order to provide a huge traffic rate for variable types of requirement and service in the future, wider and higher frequency bandwidths are used to achieve the goal. However, the higher bands in which the transmission is performed, the more severe the propagation loss is. Hence, in NR, beamforming technology has been considered and accepted as a method to alleviate the problem and improve the coverage. In NR, there may be one or multiple of beam pair links between UE and network to perform communication. Some mechanisms are for network to trace beam quality of beam pair links between network node and UE. For example, network configures one or more than one RS for UE to measure, e.g. SS/PBCH blocks, CSI-RS for beam measurement or L1-RSRP computation. Network can configure one or more than one resource set/setting, wherein UE knows the one or more than one resource set/setting is for beam measurement or L1-RSRP computation. Network can also configure report configuration for UE to report measured beam quality or L1-RSRP value. Moreover, the network may configure one or more than one SRS for UE to transmit. Network can measure the SRS transmitted from UE to get the beam quality of beam pair links.

As shown in FIG. 14, there is a beam pair link between network node and UE, wherein the network beam is directional to the UE, and the UE beam is directional to the network. The network node and the UE may perform communication via the beam pair link. It means that the network can perform DL transmission to the UE via the beam pair link. Moreover, the UE may perform reception via the beam pair link. In one embodiment, it could mean that the UE can perform UL transmission to the network node via the beam pair link. Moreover, the network node may perform reception via the beam pair link.

For the same network node, the UE may perform beamforming to generate the same direction beam for UE transmission and UE reception. In one embodiment, for the same network node, the UE transmission beam and the UE reception beam may be generated with/toward the same direction (for the same beam pair link). The UE transmission beam may be QCLed with the UE reception beam.

Figures 17A, 17B:
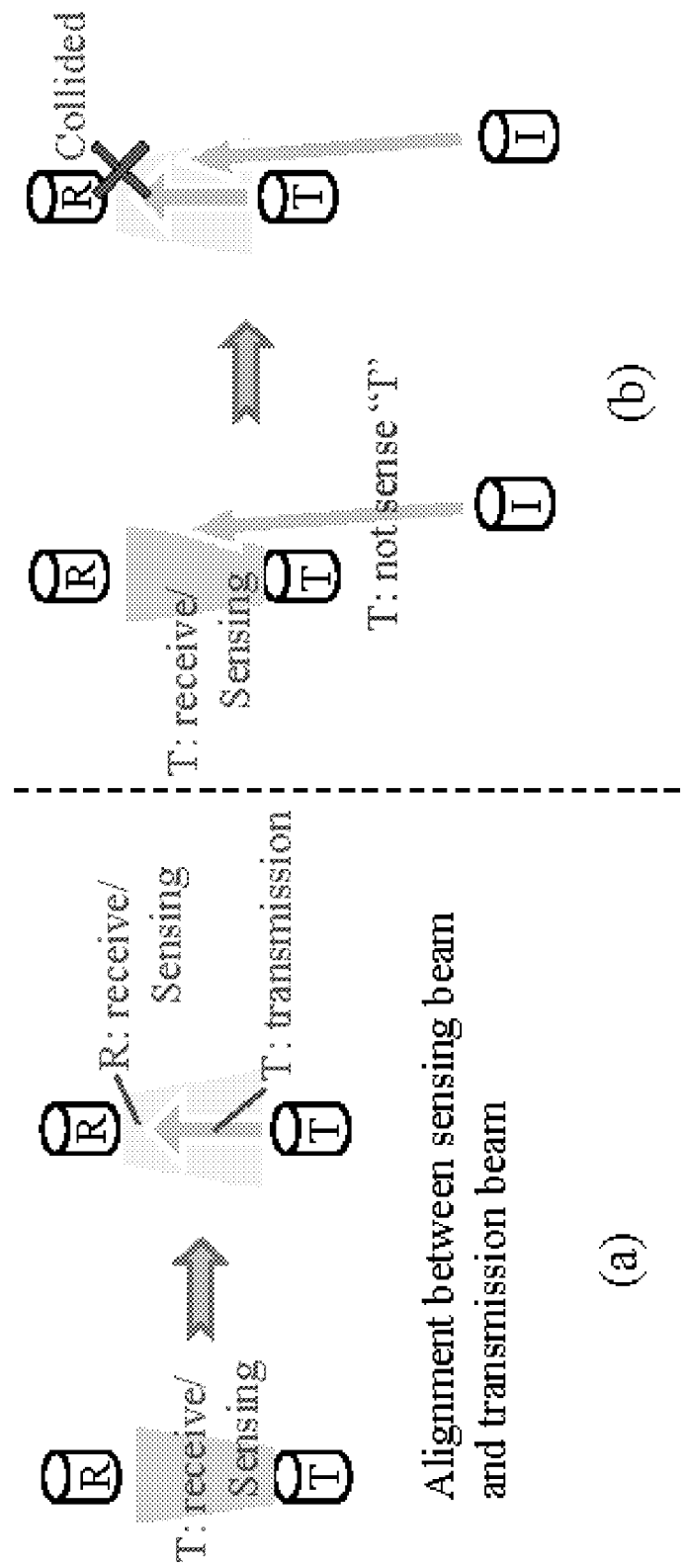
FIGS. 17(a) and 17(b) are diagrams according to one exemplary embodiment.

In NR, V2X and/or P2X transmission may be performed in higher frequency band. Beamforming technology may be considered for V2X and/or P2X transmission. For supporting sensing-based resource selection, if following the concept of 5G NR, a UE may perform sensing via a sensing beam before selecting a resource for performing transmission via a transmission beam, wherein the UE sensing beam and the UE transmission beam may be generated with the same direction. As an instance shown in FIG. 17(a), the UE "T" may perform sensing via the sensing beam, wherein a UE "R" may be located within the sensing region of the sensing beam of the UE "T". In response to the sensing result, the UE "T" may select a resource for performing transmission via a transmission beam, wherein the sensing beam and the transmission beam of the UE "T" may be generated with the same direction. The UE "R" may receive or detect the transmission from the UE "T".

However, there may be some difference between NR network-to-UE communication and V2X communication. For the communication between network and UE, the scheduling is controlled or managed via the network. Since the network can know channel conditions of most of UEs within the coverage, thus the network can properly schedule the UE reception of network-to-UE transmission and the UE transmission of UE-to-network transmission. Interference in reception side can be avoided or eliminated.

As for V2X communication in sensing-based resource selection mode, a V2X UE may not only know channel condition of other UEs but also the transmission/reception situation of the other UEs if the other UEs are not located within the sensing region of the V2X UE. For the instance shown in FIG. 17(b), the UE "T" may perform sensing via the sensing beam, wherein the UE "R" may be located within the sensing region of the sensing beam of the UE "T". In response to the sensing result, the UE "T" may select a resource for performing transmission via a transmission beam, wherein the sensing beam and the transmission beam of the UE "T" may be generated with the same direction. But, the sensing beam of the UE "T" cannot acquire the channel condition and transmission or reception situation of the UE "I" since the UE "I" is not located within the sensing region of the sensing beam of the UE "T". Thus, the UE "R" may receive or detect the transmission from the UE "T" and the transmission from the UE "I" in some of the same frequency and time resource(s). The collided transmission may induce that the UE "R" cannot receive successfully not only the transmission from the UE "T" but also the transmission from the UE "I".

To solve this issue, one alternative is generally that the transmission on one direction may be based on the sensing result of one or multiple other directions. In one embodiment, the transmission on one beam may be based on the sensing result of one or multiple other beams. Resource selection for transmission on one direction may be based on the sensing result of resources on one or multiple other directions, or based on the sensing result of resources on one or multiple other beams.

In one embodiment, for a transmission on one direction, the associated sensing direction(s) comprise at least the opposite direction of the transmission direction. For a transmission on one beam, the associated sensing beam(s) comprise at least the opposite direction of the transmission beam. The sensing in opposite direction of the transmission direction can assist a transmitter UE know whether any possible transmission from other UEs will interfere with the transmission in the transmission direction from the transmitter UE, for receiving UE(s) located in the region of the transmission direction.

Figures 18A, 18B:
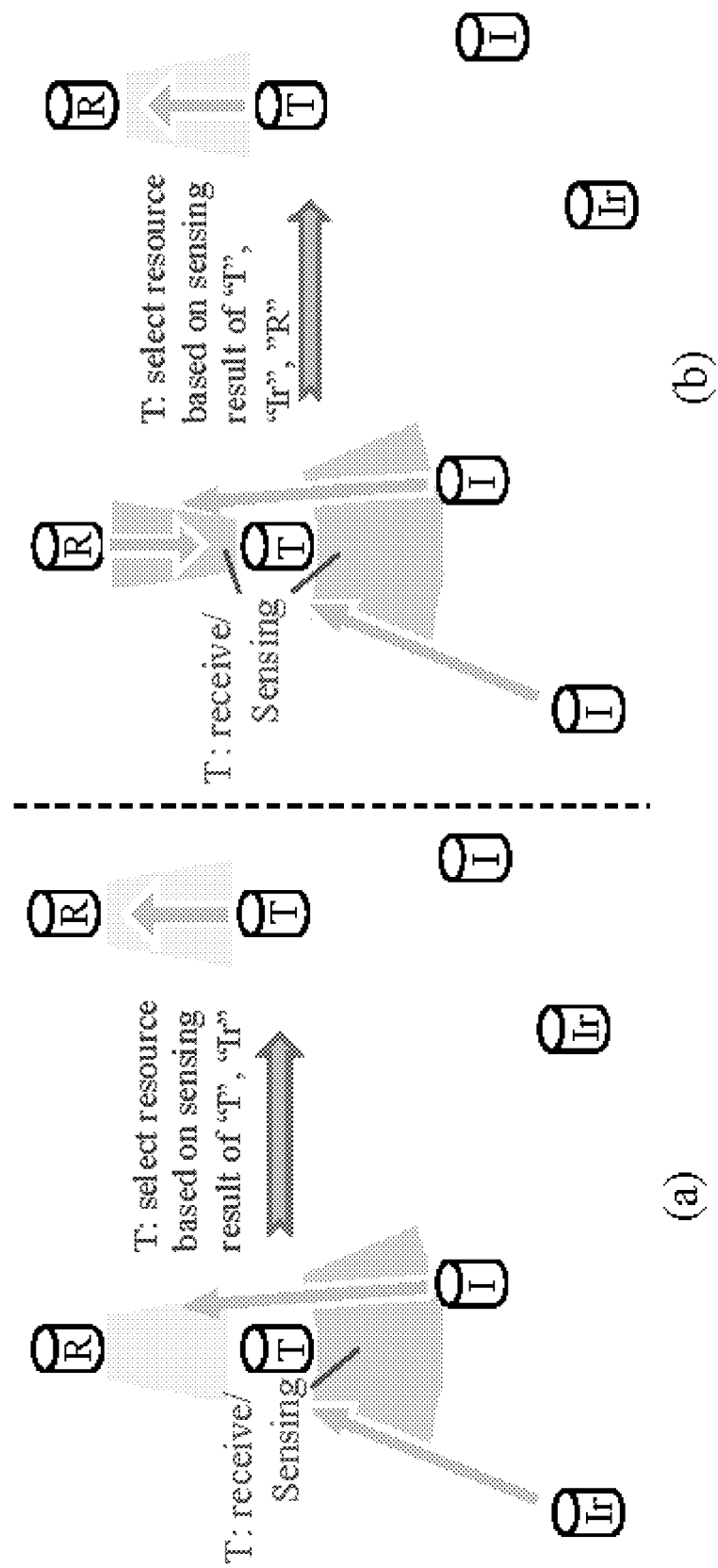
FIGS. 18(a) and 18(b) are diagrams according to one exemplary embodiment.

As an example shown in FIG. 18(a), before the UE "T" performs transmission to a direction, wherein the UE "R" may be located within the transmission region, the UE needs to perform sensing on one or multiple other directions which comprise at least the opposite direction of the transmission direction. Then, the UE "T" may sense some transmission from the UE "I" or the UE "Ir". For the reception of the UE "R", if the UE "T" selects the same resources as the transmission from the UE "I" or the UE "Ir", the transmission from the UE "I" or the UE "Ir" may interfere with the transmission from the UE "T". Thus, the UE "T" may select a resource based on the sensing result on the one or multiple other directions, e.g. exclude the resource which may be utilized in transmission from the UE "I" or the UE "Ir".

In one embodiment, the (angular) width of sensing region may be the same or wider than the (angular) width of the transmission region. The (angular) width of sensing beam may be the same or wider than the (angular) width of the transmission beam. If the (angular) width of sensing beam is the same or smaller than the (angular) width of the transmission beam, the UE "T" may not be able to sense the transmission from "Ir". It is because the coverage width becomes wider as distance from the center increases.

In one embodiment, the transmission from the UE "T" may be unicast transmission. The transmission from the UE "T" may be for one another UE, e.g. the UE "R". The transmission from the UE "T" may also be group transmission. The transmission from the UE "T" may be for a group of UEs, e.g. the group of UEs comprises the UE "R". In addition, the transmission from the UE "T" may be broadcast transmission. The transmission from the UE "T" may be for multiple UEs.

In another embodiment, for a transmission on one direction, the associated sensing direction(s) comprise at least the opposite direction of the transmission direction and the transmission direction. For a transmission on one beam, the associated sensing beam(s) comprise at least the opposite direction of the transmission beam and the direction of the transmission beam. It may be applicable for a UE being able to generate more than one beam simultaneously. The sensing in opposite direction of the transmission direction can assist a transmitter UE know whether any possible transmission from other UEs will interfere with the transmission in the transmission direction from the transmitter UE, for receiving UE(s) located in the region of the transmission direction. Moreover, the sensing in the transmission direction can assist a transmitter UE know whether any possible transmission from (receiving) UE(s) located in the region of the transmission direction. Since a UE may not be able to perform transmission and reception simultaneously in the same direction or beam, the transmitter UE may need to select a resource wherein there is no possible transmission from (receiving) UE(s) located in the region of the transmission direction.

As an example shown in FIG. 18(b), before the UE "T" performs transmission to a direction, wherein the UE "R" may be located within the transmission region, the UE needs to perform sensing on one or multiple other directions which comprise at least the opposite direction of the transmission direction and the transmission direction. Then, the UE "T" may sense some transmission from the UE "I" or the UE "Ir" and some transmission from the UE "R". For the reception of the UE "R", if the UE "T" selects the same resources as the transmission from the UE "I" or the UE "Ir", the transmission from the UE "I" or the UE "Ir" may interfere with the transmission from the UE "T". Thus, the UE "T" may select a resource based on the sensing result on the opposite direction of the transmission direction, e.g. exclude the resource which may be utilized in transmission from the UE "I" or the UE "Ir". Moreover, for the reception of the UE "R", if the UE "T" selects the same (time) resources as the UE "R" performs transmission as well, the UE "R" may not be able to receive the transmission from the UE "T". Thus, the UE "T" may select a resource based on the sensing result on the transmission direction, e.g. exclude the (time) resource which may be utilized in transmission from the UE "R".

In one embodiment, the transmission from the UE "R" means the transmission in the direction forward the UE "T". The (angular) width of sensing region on the opposite direction of the transmission direction may be the same or wider than the (angular) width of the transmission region. Furthermore, the (angular) width of sensing region on the transmission direction may be the same or wider than the (angular) width of the transmission region. In addition, the (angular) width of sensing beam on the opposite direction of the transmission direction may be the same or wider than the (angular) width of the transmission beam. The (angular) width of sensing beam on the transmission direction may also be the same or wider than the (angular) width of the transmission beam.

In one embodiment, the transmission from the UE "T" may be unicast transmission. The transmission from the UE "T" may be for one another UE, e.g. the UE "R". The transmission from the UE "T" may also be group transmission. In addition, the transmission from the UE "T" may be for a group of UEs, e.g. the group of UEs comprises the UE "R". Furthermore, the transmission from the UE "T" may be broadcast transmission. The transmission from the UE "T" may be for multiple UEs. Alternatively, the transmission from the UE "T" may not be broadcast transmission.

In one embodiment, a UE performs sensing on a second direction, and the UE performs transmission on a resource on a first direction, wherein the resource is selected based on the sensing result of the second direction. In one embodiment, a UE performs sensing on a second direction and a first direction, and the UE performs transmission on a resource on the first direction, wherein the resource is selected based on the sensing result of the second direction and the first direction. In one embodiment, a UE performs sensing on a second beam, and the UE performs transmission on a resource on a first beam, wherein the resource is selected based on the sensing result of the second beam. In one embodiment, a UE performs sensing on a second beam and a first beam, and the UE performs transmission on a resource on the first beam, wherein the resource is selected based on the sensing result of the second beam and the first beam.

In one embodiment, the (relative) angular difference between the second direction and the first direction may be at least larger than X degrees. The (relative) angular difference between the second beam and the first beam may be at least larger than X degrees. X may be a fixed value. X may also be any of 30, 60, 90, 120, or 150. Furthermore, X may be one or multiple times of the beam (angular) width generated by the UE, or one or multiple times of the beam (angular) width of the first beam. The number of the multiple times may be smaller than the number of beams for performing beam sweeping once. For X, the number of the multiple times may be smaller than half of the number of beams for performing beam sweeping once. The number of the multiple times may be larger than one.

In one embodiment, the second direction may comprise the opposite direction of the first direction. Alternatively, the second direction may not comprise the first direction. Furthermore, the second direction may comprise one or multiple direction(s) other than the first direction. The second beam may also comprise the opposite direction of the first beam. The second beam may not comprise the first beam. The second beam may comprise on one or multiple direction(s) other than the direction of the first beam.

In one embodiment, the (angular) width of sensing region on the second direction may be the same or wider than the (angular) width of transmission region on the first direction. The (angular) width of sensing region on the first direction may be the same or wider than the (angular) width of transmission region on the first direction. The (angular) width of the second beam may be the same or wider than the (angular) width of the first beam. The (angular) width of the first beam for sensing may be the same or wider than the (angular) width of the first beam for transmission.

In one embodiment, the UE may generate a receiving beam comprising the second direction and performs the sensing via the receiving beam. The UE may also generate a receiving beam comprising the first direction and performs the sensing via the receiving beam. Furthermore, the UE may generate a transmission beam comprising the first direction and performs the transmission via the transmission beam.

In one embodiment, the UE may perform omni-directional reception or sensing and then performs digital computing on the reception or sensing result (e.g. digital beamforming) to generate a sensing result on or toward the second direction. The UE may also perform omni-directional reception or sensing and then perform digital computing on the reception or sensing result (e.g. digital beamforming) to generate a sensing result on or toward the first direction. Furthermore, the UE may perform omni-directional reception or sensing and then perform digital beamforming on the reception or sensing result to generate a sensing result on the second beam. In addition, the UE may perform omni-directional reception or sensing and then perform digital beamforming on the reception or sensing result to generate a sensing result on the first beam.

In one embodiment, the UE may receive a transmission on the second direction or the second beam. The UE may perform (time and frequency) resource selection with excluding the (time and frequency) resources associated with the received transmission.

In one embodiment, the UE may receive a transmission on the first direction or the first beam. The UE may perform (time and frequency) resource selection with excluding the (time and frequency) resources associated with the received transmission.

In one embodiment, the resources associated with the received transmission means that the resources are expected to be utilized by a UE which transmits the received transmission. The (frequency) resources associated with the received transmission means that the resources are with the same frequency resources as the received transmission. The (time) resources associated with the received transmission means that the resources are with time difference on one or multiple times of a time period from the received transmission.

In one embodiment, the UE may perform energy sensing on the second direction or the second beam to derive metric for each candidate resource. The UE may perform (time and frequency) resource selection with excluding the candidate resources with larger metric. Additionally or alternatively, the UE may perform (time and frequency) resource selection with selecting the candidate resources with smaller metric.

In one embodiment, the candidate resources with larger metric may mean the metric of the candidate resources is larger than metric of a percentage of total candidate resources. The candidate resources with smaller metric may mean the metric of the candidate resources is smaller than metric of a percentage of total candidate resources.

In one embodiment, the UE performs sensing or reception on the first direction may mean that the UE performs sensing or reception with QCL (Quasi Co-Location) associated to a first reference signal. Furthermore, the UE performs sensing or reception on the second direction may mean that the UE performs sensing/reception with QCL associated to a second reference signal. In addition, the UE performs transmission on the first direction may mean that the UE performs transmission with QCL associated to a first reference signal.

In one embodiment, the UE performs sensing or reception on the first beam may mean that the UE performs sensing or reception with QCL associated to a first reference signal. Furthermore, the UE performs sensing or reception on the second beam may mean that the UE performs sensing/reception with QCL associated to a second reference signal. In addition, the UE performs transmission on the first beam may mean that the UE performs transmission with QCL associated to a first reference signal. In one embodiment, the reference signal may be any of demodulation signal, CSI-RS, discovery signal, and/or synchronization signal.

Another alternative is that the UE may perform sensing on multiple directions and acquire sensing result of each direction of the multiple directions. The UE may perform transmission on a resource on one direction, wherein the resource is selected based on weighted sensing results of the multiple directions. In one embodiment, the resource may be selected based on the weighted sum of the sensing results of the multiple directions. The resource may also be selected based on the summation of the sensing results of the multiple directions with respective weighting.

Additionally or alternatively, the UE may derive a directional result for one direction, wherein the directional result is derived from weighting the sensing results of the multiple directions. In one embodiment, the directional result may be derived from weighted sum of the sensing results of the multiple directions. The directional result may also be derived from the summation of the sensing results of the multiple directions with respective weighting. The UE may perform transmission on a resource on the one direction, wherein the resource is selected based on the directional result for the one direction.

In one embodiment, the UE may perform sensing on multiple beams and acquire sensing result of each beam of the multiple beams. The UE may perform transmission on a resource on one beam, wherein the resource is selected based on weighted sensing results of the multiple beams. The resource may be selected based on the weighted sum of the sensing results of the multiple beams. The resource may also be selected based on the summation of the sensing results of the multiple beams with respective weighting.

Additionally or alternatively, the UE may derive a directional result for one beam, wherein the directional result is derived from weighting the sensing results of the multiple beams. The directional result may be derived from weighted sum of the sensing results of the multiple beams. The directional result may also be derived from the summation of the sensing results of the multiple beams with respective weighting. The UE may perform transmission on a resource on the one beam, wherein the resource is selected based on the directional result for the one beam.

In one embodiment, the weighting on the sensing results of different directions or different beams may be different. Furthermore, the weighting for the sensing results of (a beam comprising) the opposite direction of the first direction or the first beam may be the largest weighting. The weighting for the sensing results of (a beam comprising) the opposite direction of the first direction or the first beam may be larger than the weighting for the sensing results of (a beam comprising) the vertical direction of the first direction or the first beam. The weighting for the sensing results of (a beam comprising) the opposite direction of the first direction or the first beam may also larger than the weighting for the sensing results of other directions or other beams. In addition, the weighting for the sensing results of (a beam comprising) the opposite direction of the first direction or the first beam may be larger than the weighting for the sensing results of other directions or other beams, except the first direction or the first beam.

In one embodiment, the weighting for the sensing results of the first direction or the first beam may be the largest weighting. The weighting for the sensing results of the first direction or the first beam may be larger than the weighting for the sensing results of (a beam comprising) the vertical direction of the first direction or the first beam. In addition, the weighting for the sensing results of the first direction or the first beam may be larger than the weighting for the sensing results of other directions or other beams. Furthermore, the weighting for the sensing results of the first direction or the first beam may be the larger than the weighting for the sensing results of other directions or other beams, except (a beam comprising) the opposite direction of the first beam.

In one embodiment, the weighting for the sensing results of (a beam comprising) the opposite direction of the first direction or the first beam is one. The weighting for the sensing results of (a beam comprising) the opposite direction of the first direction or the first beam may be one, and the weighting for the sensing results of other directions or other beams may be zero.

In one embodiment, the weighting for the sensing results of the first direction or the first beam may be one. The weighting for the sensing results of (a beam comprising) the opposite direction of the first direction or the first beam may be non-zero and the same as the weighting for the sensing results of the first direction or the first beam, and the weighting for the sensing results of other directions or other beams may be zero.

In one embodiment, the weighting for the sensing results of some direction(s) or some beams may be zero. Furthermore, the weighting for the sensing results of (a beam comprising) the vertical direction(s) of the first direction or the first beam may be zero.

In one embodiment, the weighting for the sensing results of a direction may be zero if the (relative) angular difference between the direction and the first direction is smaller than Y degrees. The weighting for the sensing results of a beam may be zero if the (relative) angular difference between the beam and the first beam is smaller than Y degrees. Furthermore, the weighting for the sensing results of a direction may be zero if the (relative) angular difference between the direction and the first direction is smaller than Y degrees, except the first direction. In addition, the weighting for the sensing results of a beam may be zero if the (relative) angular difference between the beam and the first beam is smaller than Y degrees, except the first beam.

In one embodiment, Y may be a fixed value or any of 30, 60, 90, 120, or 150. Y may also be one or multiple times of the beam (angular) width generated by the UE, or one or multiple times of the beam (angular) width of the first beam. For Y, the number of the multiple times may be smaller than the number of beams for performing beam sweeping once, or may be smaller than half of the number of beams for performing beam sweeping once. In one embodiment, for Y, the number of the multiple times may be larger than one.

In one embodiment, if a direction d1 is with larger angular difference (relatively comparing to the first direction) than a direction d2, the weighting for the sensing results of the direction d1 is larger than or equal to the weighting for the sensing results of the direction d2. The larger (relative) angular difference between a direction and the first direction is, the larger weighting for the sensing results of the direction will be.

In one embodiment, if a beam b1 is with larger angular difference (relatively comparing to the first beam) than a beam b2, the weighting for the sensing results of the beam b1 may be larger than or equal to the weighting for the sensing results of the beam b2. The summation of all the weightings for the sensing results of the multiple direction(s) or the multiple beams may be one or larger than one.

In one embodiment, if the sensing result for a direction i is $S_i$, the directional result for the first direction d may be the derived result of $\Sigma_i w_{d,i} \cdot S_i$, wherein $w_{d,i}$ is the weighting of the sensing result of the direction i for deriving the directional result for the first direction d. The directional results for different directions may be derived with applying different weighting on the sensing results of the multiple directions. For the direction result for the direction d1 and d2, the $w_{d1,i}$ may be different from the $w_{d2,i}$ for some i.

In one embodiment, if the sensing result for a beam i is $S_i$, the directional result for the first beam b may be as the derived result of $\Sigma_i w_{b,i} \cdot S_i$, wherein $w_{b,i}$ is the weighting of the sensing result of the beam i for deriving the directional result for the first beam b. The directional results for different beams may also be derived with applying different weighting on the sensing results of the multiple beams. For the direction result for the beam b1 and b2, the $w_{b1,i}$ may be different from the $w_{b2,i}$ for some i.

Figure 19:
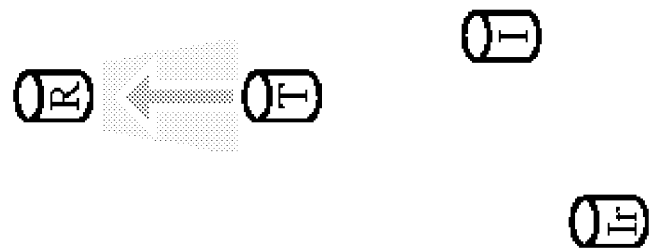
FIG. 19 is a diagram according to one exemplary embodiment.
Figure 19:
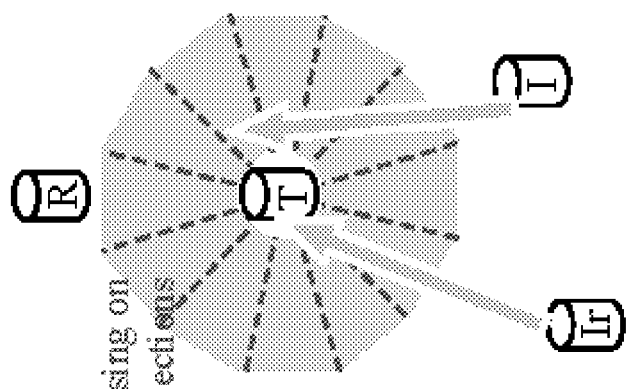

As an example shown in FIG. 19, the UE "T" may perform sensing on the 12 directions or beams and acquire respective sensing result of these directions or beams. Additionally or alternatively, the UE "T" may perform sensing on some of the 12 directions or beams and acquire respective sensing result of these directions or beams. The UE "T" may perform weighting on the sensing results of these directions or beams (to derive a directional result). The sensing results of different directions or beams may be applied with different weighting. For the instance, the UE "T" wants to perform a transmission on a direction or a beam toward FRONT. The sensing result of the direction or the beam toward BACK is applied with weighting 0.4. The sensing results of another two directions or another two beams are applied with weighting 0.3. The sensing results of remaining directions or remaining beams are applied with weighting 0. The UE may select a resource for transmission on the direction or the beam toward FRONT, wherein the resource is selected based on the directional result or based on the weighted sensing results of these directions or beams.

The sensing may mean that the UE performs energy sensing. The UE may perform RSSI measurement to derive metric for each candidate resource. The UE may exclude the candidate resources with larger metric to generate a valid candidate resource set. Additionally or alternatively, the UE may perform select the candidate resources with smaller metric to generate a valid candidate resource set. In one embodiment, the UE may perform (time and frequency) resource selection to select one or more than one candidate resource(s) from the valid candidate resource set and perform transmission on the selected one or more than one candidate resource(s) on the direction or the beam toward FRONT.

Figure 20:
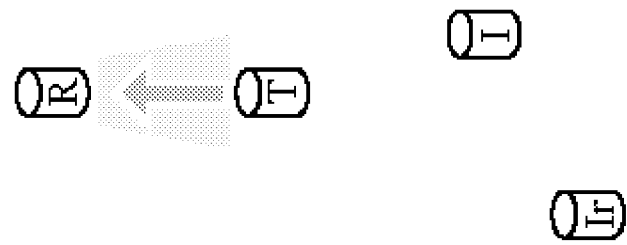
FIG. 20 is a diagram according to one exemplary embodiment.
Figure 20:
Figure 20:
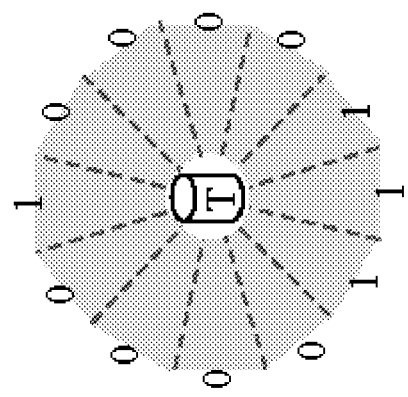
Figure 20:
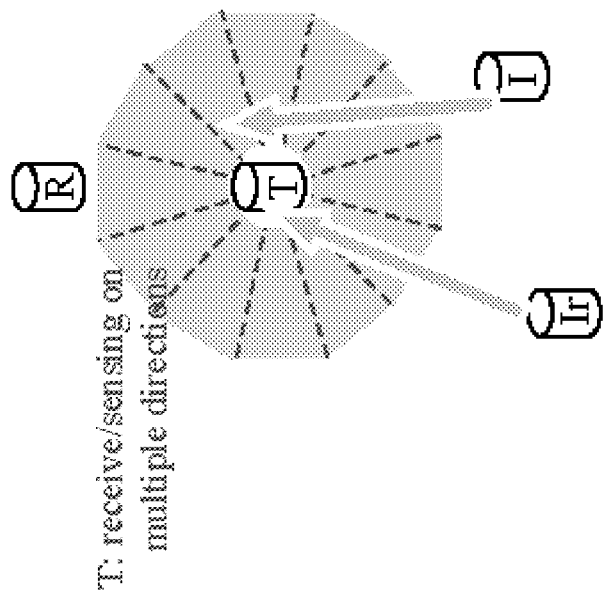

As an example shown in FIG. 20, the UE "T" may perform sensing on the 12 directions or beams and acquire respective sensing result of these directions or beams. Additionally or alternatively, the UE "T" may perform sensing on some of the 12 directions or beams and acquire respective sensing result of these directions or beams. The UE "T" may perform weighting on the sensing results of these directions or beams (to derive a directional result). The sensing results of different directions or beams may be applied with different weighting. For the instance, the UE "T" wants to perform a transmission on a direction or a beam toward FRONT. The sensing result of the direction or the beam toward BACK and/or FRONT is applied with weighting 1. The sensing results of another two directions or another two beams are applied with weighting 1. The sensing results of remaining directions or remaining beams are applied with weighting 0. The UE may select a resource for transmission on the direction or the beam toward FRONT, wherein the resource is selected based on the directional result or based on the weighted sensing results of these directions or beams.

The sensing may mean that the UE performs reception. In one embodiment, if the UE receives a transmission on a direction or a beam which weighting is one or larger than a value, the UE may exclude the candidate (time and frequency) resources associated with the received transmission. Additionally or alternatively, if the UE receives a transmission on a direction or a beam (toward FRONT) which weighting is one or larger than a value, the UE may exclude the candidate (time) resources associated with the received transmission. The UE may perform (time and frequency) resource selection to select one or more than one candidate resource(s) from the remaining candidate resources and perform transmission on the selected one or more than one candidate resource(s) on the direction or the beam toward FRONT.

The sensing may mean that the UE performs energy sensing. In one embodiment, the UE may perform RSSI measurement to derive metric for each candidate resource. The UE may exclude the candidate resources with larger metric to generate a valid candidate resource set. Additionally or alternatively, the UE may perform select the candidate resources with smaller metric to generate a valid candidate resource set. The UE may perform (time and frequency) resource selection to select one or more than one candidate resource(s) from the valid candidate resource set and perform transmission on the selected one or more than one candidate resource(s) on the direction or the beam toward FRONT.

In one embodiment, the UE may generate a receiving beam comprising a direction and performs the sensing via the receiving beam. The UE may generate multiple receiving beams comprising multiple directions respectively and perform the sensing via the multiple receiving beams, wherein different receiving beams may comprise different directions.

In one embodiment, the UE may perform omni-directional reception or sensing and then perform a digital computing on the reception or sensing result (e.g. digital beamforming) to generate the sensing result on or toward a direction. The UE may perform omni-directional reception or sensing and then performs digital computing on the reception or sensing results (e.g. digital beamforming) to generate the sensing result on or toward the multiple directions, wherein the sensing results of different directions may be derived from different digital computing.

In one embodiment, the UE may generate a receiving beam and performs the sensing via the receiving beam. The UE may also generate multiple receiving beams and perform the sensing via the multiple receiving beams.

In one embodiment, the UE may perform omni-directional reception or sensing and then performs a digital computing on the reception or sensing result (e.g. digital beamforming) to generate the sensing result on or toward a beam. The UE may perform omni-directional reception or sensing and then performs digital computing on the reception or sensing result (e.g. digital beamforming) to generate the sensing result on or toward the multiple beams, wherein the sensing results of different beams are derived from different digital computing.

In one embodiment, the UE may receive a transmission on a direction. The UE may perform (time and frequency) resource selection with excluding the (time and frequency) resources associated with the received transmission if the weighting of the sensing result of the direction is one or larger than a value.

In one embodiment, the UE may receive a transmission on one of the multiple directions. The UE may perform (time and frequency) resource selection with excluding the (time and frequency) resources associated with the received transmission if the weighting of the sensing result of the one direction is one or larger than a value.

In one embodiment, the UE may receive a transmission on the beam. The UE may perform (time and frequency) resource selection with excluding the (time and frequency) resources associated with the received transmission if the weighting of the sensing result of the beam is one or larger than a value.

In one embodiment, the UE may receive a transmission on one of the multiple beams. The UE may performs (time and frequency) resource selection with excluding the (time and frequency) resources associated with the received transmission if the weighting of the sensing result of the one beam is one or larger than a value.

In one embodiment, the resources associated with the received transmission means that the resources are expected to be utilized by a UE which transmits the received transmission. The (frequency) resources associated with the received transmission means that the resources are with the same frequency resources as the received transmission. The (time) resources associated with the received transmission means that the resources is with time difference on one or multiple times of a time period from the received transmission.

In one embodiment, the UE may perform energy sensing on the multiple directions. The UE may derive metric for each candidate resource from the weighted sensing results of the multiple directions. The UE may perform (time and frequency) resource selection with excluding the candidate resources with larger metric. Additionally or alternatively, the UE may perform (time and frequency) resource selection with selecting the candidate resources with smaller metric.

In one embodiment, the UE may perform energy sensing on the multiple directions. The UE may derive the directional result from weighting the sensing results of the multiple directions. The UE may derive metric for each candidate resource from the directional result. The UE may perform (time and frequency) resource selection with excluding the candidate resources with larger metric. Additionally or alternatively, the UE may perform (time and frequency) resource selection with selecting the candidate resources with smaller metric.

In one embodiment, the UE may perform energy sensing on the multiple beams. The UE may derive metric for each candidate resource from the weighted sensing results of the multiple beams. The UE may perform (time and frequency) resource selection with excluding the candidate resources with larger metric. Additionally or alternatively, the UE may perform (time and frequency) resource selection with selecting the candidate resources with smaller metric.

In one embodiment, the UE may perform energy sensing on the multiple beams. The UE may derive the directional result from weighting the sensing results of the multiple beams. The UE may derive metric for each candidate resource from the directional result. The UE may perform (time and frequency) resource selection with excluding the candidate resources with larger metric. Additionally or alternatively, the UE may perform (time and frequency) resource selection with selecting the candidate resources with smaller metric.

In one embodiment, the candidate resources with larger metric may mean the metric of the candidate resources is larger than metric of a percentage of total candidate resources. The candidate resources with smaller metric may mean the metric of the candidate resources is smaller than metric of a percentage of total candidate resources.

In one embodiment, the union of the sensing regions on the multiple directions may cover all 360-degree. The multiple directions may comprise all directions the UE can perform sensing. The union of the sensing regions on the multiple beams may cover all 360-degree directions. The multiple beams may comprise all beams the UE can generate or perform sensing.

In one embodiment, the union of the sensing regions on the multiple directions may not cover all 360-degree. The multiple directions may not comprise all directions the UE can perform sensing. The multiple directions may comprise part of all directions the UE can perform sensing. In one embodiment, the union of the sensing regions on the multiple beams may not cover all 360-degree directions. The multiple beams may not comprise all beams the UE can generate or perform sensing. The multiple beams may comprise part of all beams the UE can generate or perform sensing.

In one embodiment, the UE performs sensing or reception on a direction may mean that the UE performs sensing or reception with QCL associated to a reference signal. The UE performs sensing or reception on the multiple directions may mean that the UE performs sensing or reception with QCL associated to multiple reference signals (respectively). In one embodiment, the UE performs transmission on the first direction may mean that the UE performs transmission with QCL associated to a first reference signal.

In one embodiment, the UE performs sensing or reception on a beam may mean that the UE performs sensing or reception with QCL associated to a reference signal. The UE performs sensing or reception on the multiple beams may mean that the UE performs sensing or reception with QCL associated to multiple reference signals (respectively). The UE performs transmission on the first beam may mean that the UE performs transmission with QCL associated to a first reference signal. In one embodiment, the reference signal may be any of demodulation signal, CSI-RS, discovery signal, and/or synchronization signal.

For both alternatives, in one embodiment, the energy sensing may mean that the UE performs RSSI measurement. The metric may mean RSSI or linear average of measured RSSI. The metric for a candidate resource may mean linear average of RSSI measured from associated resources of the candidate resource.

In one embodiment, the association may mean that the associated resources of the candidate resource is with same frequency resources as the candidate resource, and is with time difference on one or multiple times of another time period from the candidate resource. The other time period may be different from the time period of the first transmission. Alternatively, the other time period may be the same as the time period of the first transmission.

In one embodiment, the time period may be fixed or specified. The time period may also be configured via higher layer. Furthermore, the time period may be indicated in a signaling which schedules the received transmission.

In one embodiment, the time period may be the minimum time difference between the previous resource and the scheduled resource of the first transmission. The time period may also be derived according to TDD DL/UL configuration of a cell. The UE may perform sensing, receiving, or transmission on the cell.

In one embodiment, the time period may be derived according to the ratio of DL and UL of a cell. The UE may perform sensing, receiving, or transmission on the cell.

Alternatively, the time period may be derived according to a configuration related to DL and UL TTI distribution of a cell. The UE may perform sensing, receiving, or transmission on the cell.

Alternatively, the time period may be derived according to an indication related to DL and UL TTI distribution of a cell. The UE may perform sensing, receiving, or transmission on the cell.

In one embodiment, the time period may be in unit of slot, in unit of mini-slot, in unit of subframe, in unit of symbol, or in unit of mini-seconds. In one embodiment, the resource may comprise one or multiple subchannels, one or multiple (physical) resource blocks, one or multiple subchannels, or one or multiple (physical) resource blocks.

In one embodiment, the first transmission may be device-to-device transmission or V2X transmission. The first transmission and/or the control signaling transmission may be P2X transmission. Alternatively, the first transmission may be on PC5 interface or may be sidelink transmission.

In one embodiment, the transmission may be unicast transmission or transmission for another one UE. Alternatively, the transmission may broadcast transmission or transmission is transmission for multiple UEs. Alternatively, the transmission may be group transmission or transmission for multiple UEs. The transmission may also be transmission for a group of UEs.

In one embodiment, the (angular) width may mean angular (angular) width in degree. The (angular) width of a beam may mean the angular difference between the two half-power (−3 dB) points of the main lobe of the beam. Furthermore, the (angular) width of a beam may mean that the 3 dB beam-width (or half-power beam-width) of the beam.

In one embodiment, the opposite direction of the first direction may mean a direction with (relative) 180-degree angular difference from the first direction. The vertical direction of the first direction may mean a direction with (relative) 90-degree or 270-degree angular difference from the first direction.

In one embodiment, the relative angular difference may be within [0, 180] in degree. The relative angular difference in degree may be derived as angular difference module 360. In one embodiment, the relative angular difference in degree may be derived as "angular difference module 360" if result of "the angular difference module 360" is smaller than or equal to 180. Alternatively, the relative angular difference in degree may be derived as "360−(angular difference module 360)" if "the angular difference module 360" is larger than 180.

Figure 21:
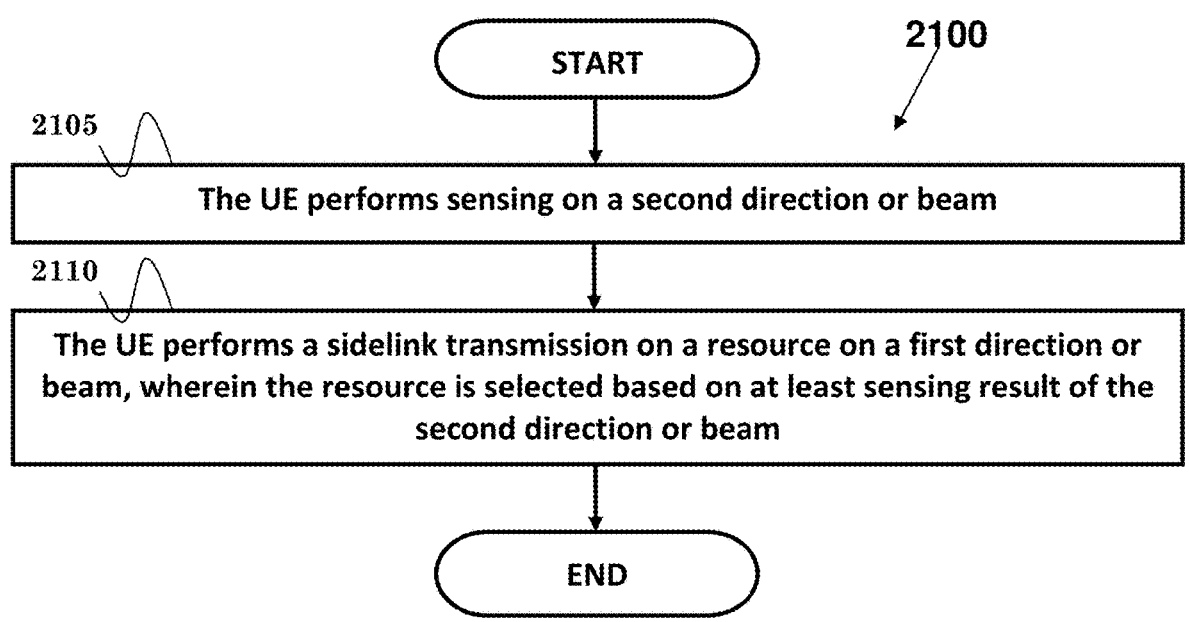
FIG. 21 is a flow chart according to one exemplary embodiment.

FIG. 21 is a flow chart 2100 according to one exemplary embodiment from the perspective of a UE. In step 2105, the UE performs sensing on a second direction or beam. In step 2110, the UE performs a sidelink transmission on a resource on a first direction or beam, wherein the resource is selected based on at least sensing result of the second direction or beam.

In one embodiment, the UE could perform sensing on the first direction or beam. Furthermore, the UE could perform the sidelink transmission on the resource on the first direction or beam, wherein the resource is selected based on at least sensing result of the second direction or beam and the first direction or beam.

In one embodiment, a relative angular difference between the second direction or beam and the first direction or beam could be at least larger than X degrees, wherein X is any of 30, 60, 90, 120, or 150. The second direction or beam may comprise the opposite direction of the first direction or beam. A (angular) width of sensing region on the second direction could be the same or wider than a (angular) width of transmission region on the first direction, and/or a (angular) width of the second beam could be the same or wider than the (angular) width of the first beam.

In one embodiment, resource selection based on the sensing result of the second direction or beam could mean that the UE performs energy sensing on the second direction or beam to derive metric for each candidate resource, and the UE performs time and/or frequency resource selection with selecting the candidate resources with a smaller metric. Furthermore, resource selection based on the sensing result of the second direction or beam could mean that the UE receives a transmission on the second direction or beam, and the UE performs time and/or frequency resource selection with excluding the time and/or frequency resources associated with the received transmission.

In one embodiment, when the UE receives a transmission on the second direction or beam, the UE may not perform time and/or frequency resource selection with excluding the time and/or frequency resources associated with the received transmission for selecting transmission resource on the first direction or beam. Furthermore, resource selection based on the sensing result of the first direction or beam means that the UE receives a transmission on the first direction or beam, and the UE performs time and/or frequency resource selection with excluding the resources associated with the received transmission. In addition, the UE may not perform energy sensing on the first direction or beam to derive metric for each candidate resource of transmission resource on the first direction or beam.

Referring back to FIGS. 3 and 4, in one exemplary embodiment of a UE, the device 300 includes a program code 312 stored in the memory 310. The CPU 308 could execute program code 312 to enable the UE (i) to perform sensing on a second direction or beam, and (ii) to perform a sidelink transmission on a resource on a first direction or beam, wherein the resource is selected based on at least sensing result of the second direction or beam. Furthermore, the CPU 308 can execute the program code 312 to perform all of the above-described actions and steps or others described herein.

Figure 22:
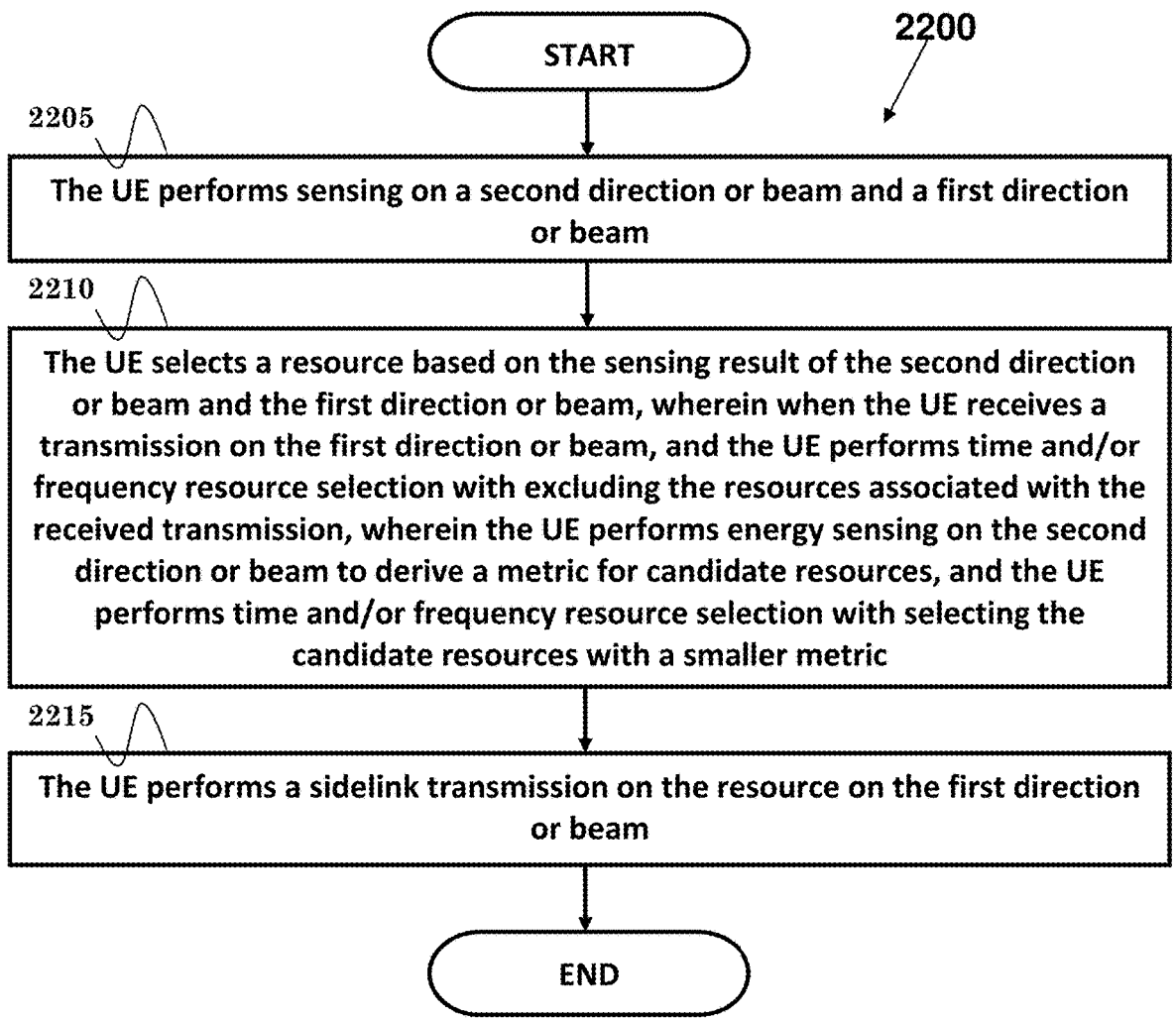
FIG. 22 is a flow chart according to one exemplary embodiment.

FIG. 22 is a flow chart 2200 according to one exemplary embodiment from the perspective of a UE. In step 2205, the UE performs sensing on a second direction or beam and a first direction or beam. In step 2210, the UE selects a resource based on the sensing result of the second direction or beam and the first direction or beam, wherein when the UE receives a transmission on the first direction or beam, and the UE performs time and/or frequency resource selection with excluding the resources associated with the received transmission, wherein the UE performs energy sensing on the second direction or beam to derive a metric for each candidate resource, and the UE performs time and/or frequency resource selection with selecting the candidate resources with a smaller metric. In step 2215, the UE performs a sidelink transmission on the resource on the first direction or beam.

In one embodiment, the second direction or beam may comprise the opposite direction of the first direction or beam. Furthermore, a (angular) width of sensing region on the second direction could be the same or wider than the (angular) width of transmission region on the first direction, and/or a (angular) width of the second beam could be the same or wider than a (angular) width of the first beam.

In one embodiment, when the UE receives a transmission on the second direction or beam, the UE may not perform time and/or frequency resource selection with excluding the time and/or frequency resources associated with the received transmission for selecting transmission resource on the first direction or beam. Furthermore, the UE may not perform energy sensing on the first direction or beam to derive metric for each candidate resource of transmission resource on the first direction or beam.

Referring back to FIGS. 3 and 4, in one exemplary embodiment of a UE, the device 300 includes a program code 312 stored in the memory 310. The CPU 308 could execute program code 312 to enable the UE (i) to perform sensing on a second direction or beam and a first direction or beam, (ii) to select a resource based on the sensing result of the second direction or beam and the first direction or beam, wherein when the UE receives a transmission on the first direction or beam, and the UE performs time and/or frequency resource selection with excluding the resources associated with the received transmission, wherein the UE performs energy sensing on the second direction or beam to derive a metric for each candidate resource, and the UE performs time and/or frequency resource selection with selecting the candidate resources with a smaller metric, and (iii) to perform a sidelink transmission on the resource on the first direction or beam. Furthermore, the CPU 308 can execute the program code 312 to perform all of the above-described actions and steps or others described herein.

Figure 23:
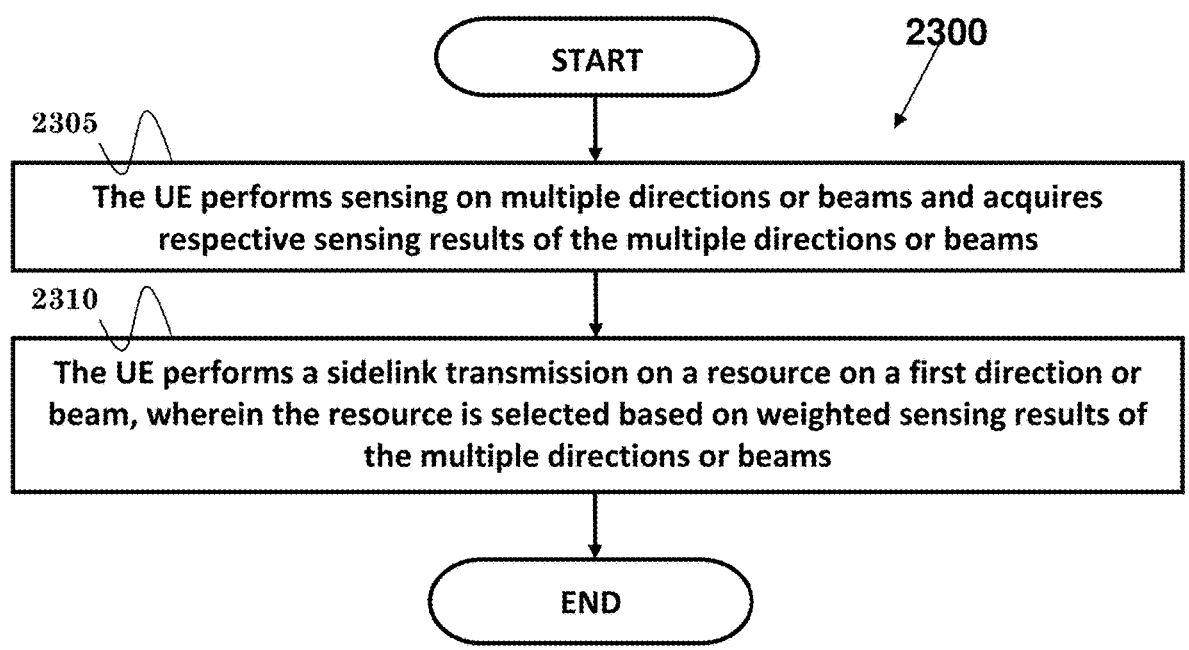
FIG. 23 is a flow chart according to one exemplary embodiment.

FIG. 23 is a flow chart 2300 according to one exemplary embodiment from the perspective of a UE. In step 2305, the UE performs sensing on multiple directions or beams and acquires respective sensing results of the multiple directions or beams. In step 2310, the UE performs a sidelink transmission on a resource on a first direction or beam, wherein the resource is selected based on weighted sensing results of the multiple directions or beams.

In one embodiment, the UE could select the resource based on a directional result for the first direction or beam, wherein the directional result is derived from weighting the sensing results of the multiple directions or beams. Furthermore, the UE performs sensing on the multiple directions or beams could mean that the UE performs omni-directional reception or sensing and then performs digital computing on the reception or sensing result to generate the sensing result on or toward the multiple directions/beams, wherein the sensing results of different directions/beams are derived from different digital computing. In addition, the UE could perform sensing on the multiple directions or beams means that the UE generates multiple receiving beams comprising the multiple directions respectively, and the UE could perform the sensing via the multiple receiving beams, wherein different receiving beams comprise different directions.

In one embodiment, the weighting for the sensing results of the opposite direction of the first direction or beam could be larger than the weighting for the sensing results of other directions or beams, except the first direction or beam.

Referring back to FIGS. 3 and 4, in one exemplary embodiment of a UE, wherein the UE is served or configured with a first cell and a second cell, the device 300 includes a program code 312 stored in the memory 310. The CPU 308 could execute program code 312 to enable the UE (i) to perform sensing on multiple directions or beams and acquires respective sensing results of the multiple directions or beams, and (ii) to perform a sidelink transmission on a resource on a first direction or beam, wherein the resource is selected based on weighted sensing results of the multiple directions or beams. Furthermore, the CPU 308 can execute the program code 312 to perform all of the above-described actions and steps or others described herein.

Figure 24:
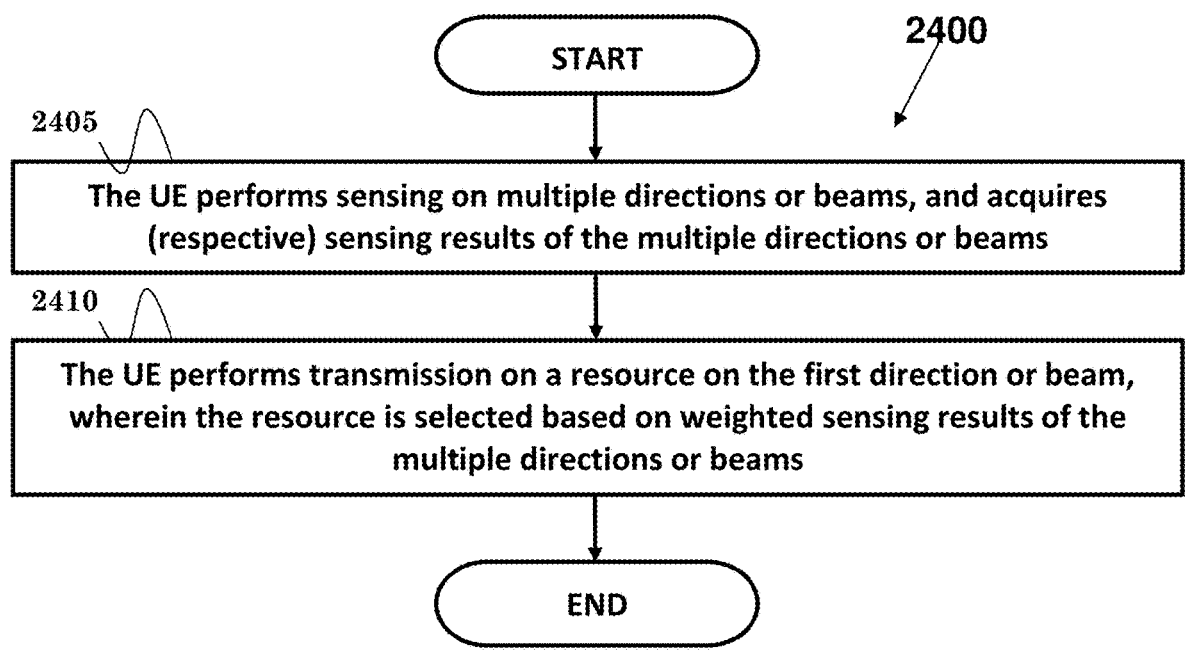
FIG. 24 is a flow chart according to one exemplary embodiment.

FIG. 24 is a flow chart 2400 according to one exemplary embodiment from the perspective of a UE. In step 2405, the UE performs sensing on multiple directions or beams, and acquires (respective) sensing results of the multiple directions or beams. In step 2410, the UE performs transmission on a resource on the first direction or beam, wherein the resource is selected based on weighted sensing results of the multiple directions or beams.

In one embodiment, the weighted sensing results of the multiple directions could mean that the weighted sum of the (respective) sensing results of the multiple directions. Furthermore, the weighted sensing results of the multiple beams could mean that the weighted sum of the (respective) sensing results of the multiple beams.

Referring back to FIGS. 3 and 4, in one exemplary embodiment of a UE, wherein the UE is served and/or configured with a first cell and a second cell, the device 300 includes a program code 312 stored in the memory 310. The CPU 308 could execute program code 312 to enable the UE (i) to perform sensing on multiple directions or beams, and to acquire (respective) sensing results of the multiple directions or beams, and (ii) to perform transmission on a resource on the first direction or beam, wherein the resource is selected based on weighted sensing results of the multiple directions or beams. Furthermore, the CPU 308 can execute the program code 312 to perform all of the above-described actions and steps or others described herein.

Figure 25:
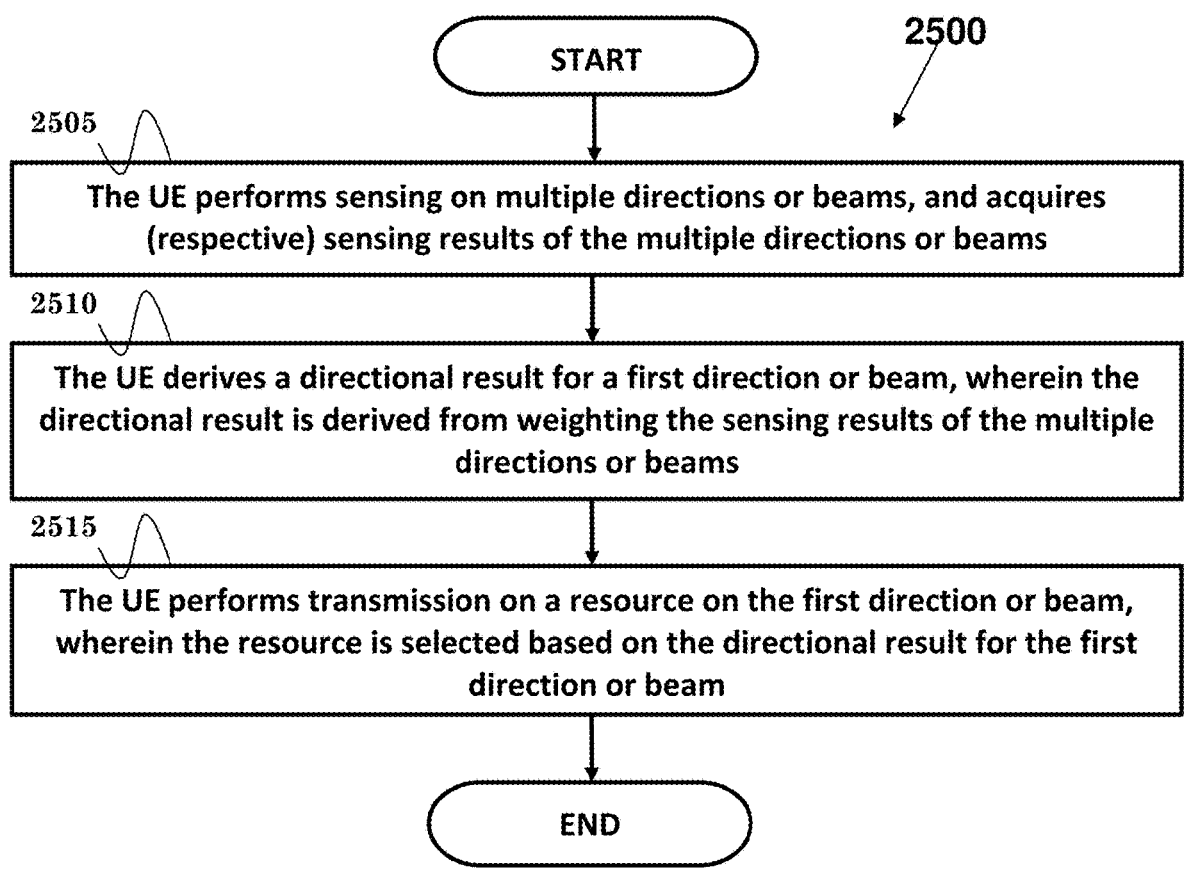
FIG. 25 is a flow chart according to one exemplary embodiment.

FIG. 25 is a flow chart 2500 according to one exemplary embodiment from the perspective of a UE. In step 2505, the UE performs sensing on multiple directions or beams, and acquires (respective) sensing results of the multiple directions or beams. In step 2510, the UE derives a directional result for a first direction or beam, wherein the directional result is derived from weighting the sensing results of the multiple directions or beams. In step 2515, the UE performs transmission on a resource on the first direction or beam, wherein the resource is selected based on the directional result for the first direction or beam.

In one embodiment, the directional result could be derived from weighting the sensing results of the multiple directions means that the directional result is derived from weighted sum of the (respective) sensing results of the multiple directions. Furthermore, the directional result could be derived from weighting the sensing results of the multiple beams means that the directional result is derived from weighted sum of the (respective) sensing results of the multiple beams.

Referring back to FIGS. 3 and 4, in one exemplary embodiment of a network, the device 300 includes a program code 312 stored in the memory 310. The CPU 308 could execute program code 312 to enable the UE (i) to perform sensing on multiple directions or beams, and to acquire (respective) sensing results of the multiple directions or beams, (ii) to derive a directional result for a first direction or beam, wherein the directional result is derived from weighting the sensing results of the multiple directions or beams, and (iii) to perform transmission on a resource on the first direction or beam, wherein the resource is selected based on the directional result for the first direction or beam. Furthermore, the CPU 308 can execute the program code 312 to perform all of the above-described actions and steps or others described herein.

In the context of the embodiments illustrated in FIGS. 24 and 25 and described above, in one embodiment, the weighting on the sensing results of different directions could be different. The weighting for the sensing results of the opposite direction of the first direction or beam could be the largest weighting. The weighting for the sensing results of the opposite direction of the first direction or beam could also be larger than the weighting for the sensing results of the vertical direction of the first direction or beam. In addition, the weighting for the sensing results of the first direction or beam could be larger than the weighting for the sensing results of the vertical direction of the first direction or beam.

In one embodiment, the weighting for the sensing results of the opposite direction of the first direction or beam could be larger than the weighting for the sensing results of other directions. The weighting for the sensing results of the first direction or beam could also be larger than the weighting for the sensing results of other directions or beams. Furthermore, the weighting for the sensing results of the opposite direction of the first direction or beam could be larger than the weighting for the sensing results of other directions, except the first direction or beam. In addition, the weighting for the sensing results of the first direction or beam could be larger than the weighting for the sensing results of other directions or beams, except the opposite direction of the first direction or beam.

In one embodiment, the weighting for the sensing results of the opposite direction of the first direction could be one or zero. The weighting for the sensing results of the first direction could be one. The weighting for the sensing results of the opposite direction of the first direction could be non-zero and the same as the weighting for the sensing results of the first direction, and the weighting for the sensing results of other directions could be zero.

In one embodiment, the weighting for the sensing results of some direction(s) could be zero. The weighting for the sensing results of the vertical direction(s) of the first direction could be zero. The weighting for the sensing results of a direction could be zero if the (relative) angular difference between the direction and the first direction is smaller than Y degrees. More specifically, the weighting for the sensing results of a direction is zero if the (relative) angular difference between the direction and the first direction could be smaller than Y degrees, except the first direction.

In one embodiment, if a direction d1 is with larger angular difference (relatively comparing to the first direction) than a direction d2, the weighting for the sensing results of the direction d1 could be larger than or equal to the weighting for the sensing results of the direction d2. The larger (relative) angular difference between a direction and the first direction is, the larger weighting for the sensing results of the direction is.

In one embodiment, summation of all the weightings for the sensing results of the multiple direction(s) could be one or larger than one.

In one embodiment, the weighting for the sensing results of a beam comprising the opposite direction of the first beam could be one. The weighting for the sensing results of a beam comprising the opposite direction of the first beam could be one, and the weighting for the sensing results of other beams could be zero. The weighting for the sensing results of the first beam could be one. The weighting for the sensing results of a beam comprising the opposite direction of the first beam could be non-zero and the same as the weighting for the sensing results of the first beam, and the weighting for the sensing results of other beams could be zero.

In one embodiment, the weighting for the sensing results of some beam(s) could be zero. The weighting for the sensing results of a beam comprising the vertical direction(s) of the first beam could also be zero. The weighting for the sensing results of a beam could be zero if the (relative) angular difference between the beam and the first beam is smaller than Y degrees. In particular, the weighting for the sensing results of a beam could be zero if the (relative) angular difference between the beam and the first beam is smaller than Y degrees, except the first beam.

In one embodiment, if a beam b1 is with larger angular difference (relatively comparing to the first beam) than a beam b2, the weighting for the sensing results of the beam b1 could be larger than or equal to the weighting for the sensing results of the beam b2. The larger (relative) angular difference between a beam and the first beam is, the larger weighting for the sensing results of the beam is.

In one embodiment, summation of all the weightings for the sensing results of the multiple beam(s) could be one or larger than one.

In one embodiment, Y could be a fixed value or any of 30, 60, 90, 120, or 150. Y could be one or multiple times of the beam (angular) width generated by the UE or one or multiple times of the beam (angular) width of the first beam. For Y, the number of the multiple times could be smaller than the number of beams for performing beam sweeping once, smaller than half of the number of beams for performing beam sweeping once, or larger than one.

In one embodiment, if the sensing result for a direction i is $S_i$, the directional result for the first direction d could be the derived result of $\Sigma_i w_{d,i} \cdot S_i$, wherein $w_{d,i}$ is the weighting of the sensing result of the direction i for deriving the directional result for the first direction d. The directional results for different directions could be derived with applying different weighting on the sensing results of the multiple directions. For the direction result for the direction d1 and d2, the $w_{d1,i}$ could be different from the $w_{d2,i}$ for some i.

In one embodiment, if the sensing result for a beam i is $S_i$, the directional result for the first beam b could be the derived result of $\Sigma_i w_{b,i} \cdot S_i$, wherein $w_{b,i}$ is the weighting of the sensing result of the beam i for deriving the directional result for the first beam b. The directional results for different beams could be derived with applying different weighting on the sensing results of the multiple beams. For the direction result for the beam b1 and b2, the $w_{b1,i}$ could be different from the $w_{b2,i}$ for some i.

In one embodiment, the UE performs sensing on a direction could mean that the UE generates a receiving beam comprising the direction and performs the sensing via the receiving beam. The UE performs sensing on the multiple directions could mean that the UE generates multiple receiving beams comprising the multiple directions respectively and performs the sensing via the multiple receiving beams, wherein different receiving beams comprise different directions.

Alternatively, the UE performs sensing on a direction could mean that the UE performs omni-directional reception or sensing and then performs a digital computing on the reception or sensing result (e.g. digital beamforming) to generate the sensing result on or toward the direction. The UE performs sensing on the multiple directions could mean that the UE performs omni-directional reception or sensing and then performs digital computing on the reception or sensing results (e.g. digital beamforming) to generate the sensing result on or toward the multiple directions, wherein the sensing results of different directions are derived from different digital computing.

In one embodiment, the UE performs sensing on a beam could mean that the UE generates a receiving beam and performs the sensing via the receiving beam. The UE performs sensing on the multiple beams could also mean that the UE generates multiple receiving beams and performs the sensing via the multiple receiving beams.

Alternatively, the UE performs sensing on a beam could mean that the UE performs omni-directional reception or sensing and then performs a digital computing on the reception or sensing result (e.g. digital beamforming) to generate the sensing result on or toward the beam. The UE performs sensing on the multiple beams could mean that the UE performs omni-directional reception or sensing and then performs digital computing on the reception or sensing result (e.g. digital beamforming) to generate the sensing result on or toward the multiple beams, wherein the sensing results of different beams are derived from different digital computing.

In one embodiment, resource selection based on the weighted sensing result of a direction could mean that the UE receives a transmission on the direction, and the UE performs (time and frequency) resource selection with excluding the (time and frequency) resources associated with the received transmission if the weighting of the sensing result of the direction is larger than a value or is one.

In one embodiment, resource selection based on the weighted sensing results of the multiple directions means that the UE receives a transmission on one of the multiple directions, and the UE performs (time and frequency) resource selection with excluding the (time and frequency) resources associated with the received transmission if the weighting of the sensing result of the one direction is larger than a value or is one.

In one embodiment, resource selection based on the weighted sensing results of a beam means that the UE receives a transmission on the beam, and the UE performs (time and frequency) resource selection with excluding the (time and frequency) resources associated with the received transmission if the weighting of the sensing result of the beam is larger than a value or is one.

In one embodiment, resource selection based on the weighted sensing results of the multiple beams could mean that the UE receives a transmission on one of the multiple beams, and the UE performs (time and frequency) resource selection with excluding the (time and frequency) resources associated with the received transmission if the weighting of the sensing result of the one beam is larger than a value or is one. The time and/or frequency resources associated with the received transmission could mean that the resources are expected to be utilized by a UE which transmits the received transmission.

In one embodiment, resource selection based on the weighted sensing results of the multiple directions could mean that the UE performs energy sensing on the multiple directions and derives metric for each candidate resource from the weighted sensing results of the multiple directions, and the UE performs (time and frequency) resource selection with excluding the candidate resources with larger metric. Furthermore, resource selection based on the weighted sensing results of the multiple beams could mean that the UE performs energy sensing on the multiple beams and derives metric for each candidate resource from the weighted sensing results of the multiple beams, and the UE performs (time and frequency) resource selection with excluding the candidate resources with larger metric.

In one embodiment, resource selection based on the directional result for the first direction could mean that the UE performs energy sensing on the multiple directions and derives the directional result from weighting the sensing results of the multiple directions, and the UE derives metric for each candidate resource from the directional result, and the UE performs (time and frequency) resource selection with excluding the candidate resources with larger metric. Furthermore, resource selection based on the directional result for the first beam could mean that the UE performs energy sensing on the multiple beams and derives the directional result from weighting the sensing results of the multiple beams, and the UE derives metric for each candidate resource from the directional result, and the UE performs (time and frequency) resource selection with excluding the candidate resources with larger metric. The candidate resources with larger metric could mean the metric of the candidate resources is larger than metric of a percentage of total candidate resources.

In one embodiment, resource selection based on the weighted sensing results of the multiple directions could mean that the UE performs energy sensing on the multiple directions and derives metric for each candidate resource from the weighted sensing results of the multiple directions, and the UE performs (time and frequency) resource selection with selecting the candidate resources with smaller metric. Furthermore, resource selection based on the weighted sensing results of the multiple beams could mean that the UE performs energy sensing on the multiple beams and derives metric for each candidate resource from the weighted sensing results of the multiple beams, and the UE performs (time and frequency) resource selection with selecting the candidate resources with smaller metric.

In one embodiment, resource selection based on the directional result for the first direction could mean that the UE performs energy sensing on the multiple directions and derives the directional result from weighting the sensing results of the multiple directions, and the UE derives metric for each candidate resource from the directional result, and the UE performs (time and frequency) resource selection with selecting the candidate resources with smaller metric. Furthermore, resource selection based on the directional result for the first beam could mean that the UE performs energy sensing on the multiple beams and derives the directional result from weighting the sensing results of the multiple beams, and the UE derives metric for each candidate resource from the directional result, and the UE performs (time and frequency) resource selection with selecting the candidate resources with smaller metric. The candidate resources with smaller metric could mean the metric of the candidate resources is smaller than metric of a percentage of total candidate resources.

In one embodiment, union of the sensing regions on the multiple directions could cover all 360 degrees. The multiple directions could include all directions the UE can perform sensing.

In one embodiment, union of the sensing regions on the multiple beams could cover all 360-degree directions. The multiple beams could include all beams the UE can generate or perform sensing.

In one embodiment, union of the sensing regions on the multiple directions may not cover all 360 degrees. The multiple directions may not comprise all directions the UE can perform sensing. The multiple directions could include part of all directions the UE can perform sensing.

In one embodiment, union of the sensing regions on the multiple beams may not cover all 360-degree directions. The multiple beams may not comprise all beams the UE can generate or perform sensing. The multiple beams could include part of all beams the UE can generate or perform sensing.

In one embodiment, the UE performs sensing or reception on a direction could mean that the UE performs sensing or reception with QCL associated to a reference signal. The UE performs sensing or reception on the multiple directions could mean that the UE performs sensing or reception with QCL associated to multiple reference signals (respectively).

In one embodiment, the UE performs transmission on the first direction could mean that the UE performs transmission with QCL associated to a first reference signal. The UE performs sensing or reception on a beam could mean that the UE performs sensing or reception with QCL associated to a reference signal.

In one embodiment, the UE performs sensing or reception on the multiple beams could mean that the UE performs sensing or reception with QCL associated to multiple reference signals (respectively). The UE performs transmission on the first beam could mean that the UE performs transmission with QCL associated to a first reference signal.

In one embodiment, the reference signal could be any of demodulation signal, CSI-RS, discovery signal, and/or synchronization signal. The energy sensing could mean that the UE performs RSSI measurement. The metric could mean RSSI or linear average of measured RSSI. The metric for a candidate resource could mean linear average of RSSI measured from associated resources of the candidate resource, wherein the association means that the associated resources of the candidate resource is with same frequency resources as the candidate resource, and is with time difference on one or multiple times of another time period from the candidate resource.

In one embodiment, the time period is fixed or specified. The time period could be configured via higher layer. The time period could be indicated in a signaling which schedules the received transmission. The time period could the minimum time difference between the received transmission and the resources associated with the received transmission. The time period could be derived (i) according to TDD DL/UL configuration of a cell, wherein the UE performs sensing (or receiving or transmission) on the cell, (ii) according to the ratio of DL and UL of a cell, wherein the UE performs sensing (or receiving or transmission) on the cell, (iii) according to a configuration related to DL and UL TTI distribution of a cell, wherein the UE performs sensing (or receiving or transmission) on the cell, or (iv) according to an indication related to DL and UL TTI distribution of a cell, wherein the UE performs sensing (or receiving or transmission) on the cell. The time period could be in unit of slot, mini-slot, subframe, symbol, or mini-seconds.

In one embodiment, the resource could include one or multiple subchannels, and/or one or multiple (physical) resource blocks. The candidate resource could include one or multiple subchannels, and/or one or multiple (physical) resource blocks.

In one embodiment, the transmission could be device-to-device transmission, V2X transmission, or P2X transmission. The transmission could be on PC5 interface, sidelink transmission, unicast transmission, broadcast transmission, or group transmission. The transmission could also be transmission for another UE, for multiple UEs, or for a group of UEs.

In one embodiment, the (angular) width could mean angular (angular) width in degree. The (angular) width of a beam could mean the angular difference between the two half-power (−3 dB) points of the main lobe of the beam. The (angular) width of a beam could also mean that the 3 dB beam-width (or half-power beam-width) of the beam.

In one embodiment, the opposite direction of the first direction could mean a direction with (relative) 180-degree angular difference from the first direction. The vertical direction of the first direction could mean a direction with (relative) 90-degree or 270-degree angular difference from the first direction.

In one embodiment, relative angular difference could be within [0, 180] in degree. Furthermore, relative angular difference in degree could be derived as angular difference module 360. More specifically, relative angular difference in degree could derived as angular difference module 360 if result of the angular difference module 360 is smaller than or equal to 180. Alternatively, relative angular difference in degree could be derived as "360−(angular difference module 360)" if the angular difference module 360 is larger than 180.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a UE (User Equipment) to perform sidelink transmission, comprising:
the UE performs sensing on a second direction or beam;
the UE receives or detects a control signaling on the second direction or beam from a second UE, wherein the control signaling schedules a transmission of the second UE in a resource pool, and wherein the resource pool comprises one or more time and/or frequency candidate resources;
the UE excludes one or more second time and/or frequency candidate resources associated with the transmission of the second UE, and selects a resource from remaining time and/or frequency candidate resources in the resource pool; and
the UE performs a sidelink transmission on the selected resource on a first direction or beam, which has a different direction than the second direction or beam.

2. The method of claim 1, further comprising:
the UE performs sensing on the first direction or beam; and the resource is selected based on at least sensing result of the second direction or beam and the first direction or beam.

3. The method of claim 2, wherein
the UE receives or detects another control signaling on the first direction or beam from a third UE, wherein the another control signaling schedules another transmission of the third UE in the resource pool; and
the UE excludes one or more first time and/or frequency candidate resources associated with the another transmission, and selects the resource from remaining time and/or frequency candidate resources in the resource pool.

4. The method of claim 2, wherein the UE performs the sidelink transmission on the selected resource in the resource pool.

5. The method of claim 1, wherein a relative angular difference between the second direction or beam and the first direction or beam is at least larger than X degrees, wherein X is any of 30, 60, 90, 120, or 150.

6. The method of claim 1, wherein the second direction or beam comprises the opposite direction of the first direction or beam.

7. The method of claim 1, wherein an angular width of sensing region on the second direction is the same or wider than an angular width of transmission region on the first direction, and/or an angular width of the second beam is the same or wider than an angular width of the first beam.

8. The method of claim 1, wherein the UE performs energy sensing on the second direction or beam to derive a metric for each candidate resource respectively, and the UE performs time and/or frequency resource selection with selecting the candidate resources with a smaller metric.

9. The method of claim 1, wherein the resource is selected based on at least sensing result of the second direction or beam.

10. The method of claim 1, wherein the one or more second time and/or frequency candidate resources associated with the transmission of the second UE are resource(s) of next scheduled transmission(s) indicated by the control signaling, and/or
wherein reference signal received power of the control signaling is larger than a threshold.

11. A method of a UE (User Equipment) to perform sidelink transmission, comprising:
the UE performs sensing on a second direction or beam and a first direction or beam, wherein the second direction or beam has a different direction than the first direction or beam;
the UE selects a resource in a resource pool based on the sensing result of the second direction or beam and the first direction or beam,
wherein the resource pool comprises one or more time and/or frequency candidate resources, and the UE receives or detects a first control signaling on the first direction or beam from another UE, wherein the first control signaling schedules a first transmission of the another UE in the resource pool, the UE excludes one or more first time and/or frequency candidate resources associated with the first transmission, and
wherein the UE performs energy sensing on the second direction or beam to derive a metric for each candidate resource, and
the UE performs time and/or frequency resource selection with selecting the candidate resources with a smaller metric from remaining time and/or frequency candidate resources in the resource pool after the exclusion; and
the UE performs a sidelink transmission on the resource on the first direction or beam.

12. The method of claim 11, wherein the second direction or beam comprises the opposite direction of the first direction or beam.

13. The method of claim 11, wherein an angular width of sensing region on the second direction is the same or wider than an angular width of transmission region on the first direction, and/or an angular width of the second beam is the same or wider than an angular width of the first beam.

14. The method of claim 11, wherein:
the UE receives or detects a second control signaling on the second direction or beam from a second UE, wherein the second control signaling schedules a second transmission of the second UE in the resource pool; and
the UE excludes one or more second time and/or frequency candidate resources associated with the second transmission in the resource pool.

15. The method of claim 11, wherein the UE performs the sidelink transmission on the selected resource in the resource pool.

16. A UE (User Equipment), comprising:
a memory; and
a processor operatively coupled with the memory, wherein the processor is configured to execute program code to:
perform sensing on a second direction or beam;
receive or detect a control signaling on the second direction or beam from a second UE, wherein the control signaling schedules a transmission of the second UE in a resource pool, and wherein the resource pool comprises one or more time and/or frequency candidate resources;
exclude one or more second time and/or frequency candidate resources associated with the transmission of the second UE, and selects a resource from remaining time and/or frequency candidate resources in the resource pool; and
perform a sidelink transmission on the selected resource on a first direction or beam, which has a different direction than the second direction or beam.

17. The UE of claim 16, wherein the processor is further configured to execute program code to:
perform sensing on the first direction or beam; and
select the resource based on at least sensing result of the second direction or beam and the first direction or beam.

18. The UE of claim 17, wherein
the UE receives or detects another control signaling on the first direction or beam from a third UE, wherein the another control signaling schedules another transmission of the third UE in the resource pool; and
the UE excludes one or more first time and/or frequency candidate resources associated with the another transmission, and selects the resource from the remaining time and/or frequency candidate resources in the resource pool.

19. The UE of claim 16, wherein the one or more second time and/or frequency candidate resources associated with the transmission of the second UE are resource(s) of next scheduled transmission(s) indicated by the control signaling, and/or
wherein reference signal received power of the control signaling is larger than a threshold.

20. The UE of claim 16, wherein the second direction or beam comprises the opposite direction of the first direction or beam.

\* \* \* \* \*